(12) United States Patent
Kirker et al.

(10) Patent No.: US 7,371,322 B2
(45) Date of Patent: May 13, 2008

(54) FILTRATION SYSTEM AND DYNAMIC FLUID SEPARATION METHOD

(75) Inventors: Curtis Kirker, Kamuela, HI (US); Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 0 days.

(21) Appl. No.: 10/903,932

(22) Filed: Jul. 30, 2004

(65) Prior Publication Data

US 2005/0023207 A1    Feb. 3, 2005

Related U.S. Application Data

(60) Provisional application No. 60/491,581, filed on Jul. 30, 2003, provisional application No. 60/491,579, filed on Jul. 30, 2003.

(51) Int. Cl.
| | |
|---|---|
| *B01D 63/00* | (2006.01) |
| *B01D 33/00* | (2006.01) |
| *B01D 35/00* | (2006.01) |
| *B01D 61/00* | (2006.01) |

(52) U.S. Cl. ............ 210/321.75; 210/350; 210/354; 210/356; 210/321.69

(58) Field of Classification Search ........... 210/321.74, 210/321.75, 349, 350, 356, 384, 391, 636, 210/106, 107, 413, 483, 321.6, 321.83, 321.84, 210/650, 367, 321.69, 321.54
See application file for complete search history.

(56) References Cited

U.S. PATENT DOCUMENTS

| | | | |
|---|---|---|---|
| 2,028,168 A | 1/1936 | Roberts | 210/76 |
| 2,538,529 A | 1/1951 | Komline | 233/20 |
| 2,664,905 A | 1/1954 | Harstick | 494/4 |
| 2,688,437 A | 9/1954 | Monnet | 223/20 |
| 3,327,401 A | 6/1967 | Stamos et al. | 34/4 |
| 3,335,079 A | 8/1967 | Nellen | |
| 3,622,003 A * | 11/1971 | Czech et al. | 210/108 |
| 3,693,415 A | 9/1972 | Whittington | 73/69.9 |
| 3,937,317 A | 2/1976 | Fleury, Jr. | 198/213 |

(Continued)

FOREIGN PATENT DOCUMENTS

| | | |
|---|---|---|
| DE | 246696 | 3/1910 |
| DE | 1755388 | 10/1957 |
| DE | 1632324 | 10/1970 |
| DE | 3409107. | 9/1985 |
| EP | 0346056 | 12/1989 |

(Continued)

OTHER PUBLICATIONS

International Search Report and Written Opinion for application No. PCT/US04/24661, 9 pages, Mailing Date Dec. 9, 2004.

(Continued)

*Primary Examiner*—Ana Fortuna
(74) *Attorney, Agent, or Firm*—Baker Botts L.L.P.

(57) ABSTRACT

A filtration system is provided with filter media operable to remove solids, particulate and colloidal matter from a process fluid. The filtration system may include one or more porous membranes which are anchored or secured on their periphery with a large open work area operable to remove selected components from the process fluid. The filter media may include an envelope formed from two membrane sheets with a spacer element disposed there between. A chamber or collection zone may be formed within the envelope to receive clarified fluid separated from the process fluid. Alternatively, the filter media may be multiple layers of spiral wound membranes or a roll of membranes.

4 Claims, 25 Drawing Sheets

U.S. PATENT DOCUMENTS

| | | | |
|---|---|---|---|
| 3,940,056 A | 2/1976 | Schmidt | 233/20 |
| 3,960,318 A | 6/1976 | Dahlberg | 233/4 |
| 3,961,746 A | 6/1976 | Werner | 233/20 |
| 3,967,778 A | 7/1976 | Hunwick | 233/7 |
| 3,977,515 A | 8/1976 | Lewoczko | 198/213 |
| 4,005,817 A | 2/1977 | Charlton | 233/22 |
| 4,015,773 A | 4/1977 | Thylefors | 233/20 |
| 4,027,820 A | 6/1977 | Kulker | 233/20 |
| 4,067,494 A | 1/1978 | Willus | 233/3 |
| 4,070,290 A | 1/1978 | Crosby | 210/91 |
| 4,071,376 A | 1/1978 | McNeer | 134/1 |
| 4,083,488 A | 4/1978 | Gunnewig | 233/20 |
| 4,103,822 A | 8/1978 | Stroucken | 233/20 |
| 4,149,668 A | 4/1979 | Zurbruggen | 233/20 |
| 4,164,317 A | 8/1979 | Nelson | 233/20 |
| 4,190,537 A * | 2/1980 | Tondreau et al. | 210/98 |
| 4,251,023 A | 2/1981 | Hohne | 233/1 |
| 4,253,962 A * | 3/1981 | Thompson | 210/414 |
| 4,288,029 A | 9/1981 | Epper et al. | 233/20 |
| 4,298,162 A | 11/1981 | Hohne | 233/7 |
| 4,311,270 A | 1/1982 | Hovstadius | 233/46 |
| 4,331,270 A | 5/1982 | Humlong | 224/32 R |
| 4,343,431 A | 8/1982 | Wehling | 233/20 |
| 4,375,870 A | 3/1983 | Bodelson | 494/40 |
| 4,379,976 A | 4/1983 | Pitchford | 310/83 |
| 4,381,849 A | 5/1983 | Conant | 494/43 |
| 4,410,319 A | 10/1983 | Zettier et al. | 494/29 |
| 4,430,221 A | 2/1984 | Spiewok | 210/380.1 |
| 4,490,133 A | 12/1984 | Zettier | 494/27 |
| 4,504,262 A | 3/1985 | Forsberg | 494/53 |
| 4,505,697 A | 3/1985 | Lee et al. | 494/35 |
| 4,514,183 A | 4/1985 | Kohlstette | 494/27 |
| 4,519,496 A | 5/1985 | Ludvegsen | 198/676 |
| 4,543,083 A | 9/1985 | Bounds | 494/4 |
| 4,569,761 A | 2/1986 | Spiewok et al. | 210/380.1 |
| 4,581,896 A | 4/1986 | Andresen | 60/487 |
| 4,629,564 A | 12/1986 | Pinato | 210/512 |
| 4,643,709 A | 2/1987 | Lee et al. | 494/37 |
| 4,645,485 A | 2/1987 | Neimerg | 494/27 |
| 4,698,053 A | 10/1987 | Stroucken | 494/70 |
| 4,701,158 A | 10/1987 | Inge et al. | 494/74 |
| 4,707,259 A | 11/1987 | Doucet | 210/351 |
| 4,710,159 A | 12/1987 | Gullers | 494/27 |
| 4,717,376 A | 1/1988 | Bruning et al. | 494/40 |
| 4,721,505 A | 1/1988 | Inge et al. | 494/74 |
| 4,729,759 A | 3/1988 | Krook | 494/4 |
| 4,762,615 A | 8/1988 | Drori | 210/333.01 |
| 4,784,634 A | 11/1988 | Schiele | 494/56 |
| 4,793,932 A | 12/1988 | Ford et al. | 210/636 |
| 4,813,923 A | 3/1989 | Johansson | 494/48 |
| 4,820,256 A | 4/1989 | Nordstrom | 494/3 |
| 4,840,612 A | 6/1989 | Pallmar | 494/2 |
| 4,861,329 A | 8/1989 | Borgstrom et al. | 494/67 |
| 4,872,988 A | 10/1989 | Culkin | 210/636 |
| 4,876,006 A | 10/1989 | Ohkubo et al. | 210/321.6 |
| 4,925,442 A | 5/1990 | Bodelson | 494/40 |
| 4,952,317 A * | 8/1990 | Culkin | 210/636 |
| 4,978,331 A | 12/1990 | Luchetta | 494/37 |
| 4,995,977 A | 2/1991 | Hilgendorff et al. | 210/321.69 |
| 5,004,542 A * | 4/1991 | Lyons et al. | 210/356 |
| 5,034,124 A * | 7/1991 | Kopf | 210/231 |
| 5,045,049 A | 9/1991 | Lantz | 494/70 |
| 5,052,996 A | 10/1991 | Lantz | 494/68 |
| 5,100,556 A * | 3/1992 | Nichols | 210/651 |
| 5,108,604 A * | 4/1992 | Robbins | 210/321.74 |
| 5,143,613 A | 9/1992 | Bitter et al. | 210/321.8 |
| 5,182,019 A | 1/1993 | Cote et al. | 210/321.8 |
| 5,197,939 A | 3/1993 | Cederkvist | 494/53 |
| 5,202,024 A | 4/1993 | Andersson et al. | 210/360 |
| 5,225,080 A * | 7/1993 | Karbachsch et al. | 210/321.75 |
| 5,234,605 A * | 8/1993 | Reipur et al. | 210/741 |
| 5,244,584 A | 9/1993 | Schlieperskoetter | 210/787 |
| 5,275,725 A * | 1/1994 | Ishii et al. | 210/321.67 |
| 5,304,312 A * | 4/1994 | Forster et al. | 210/808 |
| 5,338,284 A | 8/1994 | Knelson | 494/28 |
| 5,362,292 A | 11/1994 | Borgstrom et al. | 494/74 |
| 5,366,625 A | 11/1994 | Pedersen et al. | 210/321.78 |
| 5,374,234 A | 12/1994 | Madsen | 494/53 |
| 5,380,434 A | 1/1995 | Paschedag | 210/360 |
| 5,397,471 A | 3/1995 | Rodebush | 210/360 |
| 5,429,581 A | 7/1995 | Michand | 494/54 |
| 5,441,651 A | 8/1995 | Yamaguchi et al. | 210/780 |
| 5,445,771 A | 8/1995 | Degen | 264/22 |
| 5,500,122 A * | 3/1996 | Schwartz | 210/321.75 |
| 5,550,022 A | 8/1996 | Chakraborty et al. | 435/6 |
| 5,575,910 A * | 11/1996 | Karbachsch et al. | 210/321.75 |
| 5,599,271 A | 2/1997 | Eiken | 494/37 |
| 5,601,522 A | 2/1997 | Piramoon | 156/172 |
| 5,601,524 A | 2/1997 | Knelson | 494/29 |
| 5,618,409 A | 4/1997 | Kreill | 210/97 |
| 5,685,980 A * | 11/1997 | Patapoff et al. | 210/244 |
| 5,725,767 A * | 3/1998 | Culkin | 210/321.75 |
| 5,759,744 A | 6/1998 | Brueck et al. | 430/312 |
| 5,779,619 A | 7/1998 | Borgstrom et al. | 494/56 |
| 5,792,037 A | 8/1998 | Bodelson et al. | 494/40 |
| 5,820,767 A | 10/1998 | Kane et al. | 210/787 |
| 5,824,217 A | 10/1998 | Pearl et al. | 210/321.75 |
| 5,922,201 A | 7/1999 | Yamamori | 210/321.79 |
| 5,979,668 A | 11/1999 | Kane et al. | 210/446 |
| 6,033,564 A | 3/2000 | Kirker et al. | 210/232 |
| 6,106,715 A * | 8/2000 | Thalmann et al. | 210/321.83 |
| 6,149,572 A | 11/2000 | Knelson | 494/37 |
| 6,149,810 A * | 11/2000 | Gonzalez-Martin et al. | 210/321.84 |
| 6,161,435 A | 12/2000 | Bond et al. | 73/587 |
| 6,221,255 B1 | 4/2001 | Vadoothker | 210/739 |
| 6,248,053 B1 | 6/2001 | Ehnstrom et al. | 494/56 |
| 6,312,610 B1 | 11/2001 | Kirker et al. | 210/781 |
| 6,322,698 B1 | 11/2001 | Rios et al. | 210/321.75 |
| 6,332,913 B1 * | 12/2001 | Breitschwerdt et al. | 95/55 |
| 6,358,193 B1 | 3/2002 | Nyberg | 494/2 |
| 6,387,271 B1 | 5/2002 | Geibel et al. | 210/651 |
| 6,390,964 B1 | 5/2002 | Mackel | 494/14 |
| 6,416,666 B1 * | 7/2002 | Salyer et al. | 210/321.75 |
| 6,468,198 B1 | 10/2002 | Mackel | 494/37 |
| 6,565,747 B1 * | 5/2003 | Shintani et al. | 210/321.74 |
| 6,602,325 B1 * | 8/2003 | Frost et al. | 95/56 |
| 6,613,231 B1 * | 9/2003 | Jitariouk | 210/650 |
| 6,656,356 B2 | 12/2003 | Gungerich et al. | 210/321.8 |
| 6,673,242 B1 * | 1/2004 | Herron | 210/321.74 |
| 6,685,832 B2 | 2/2004 | Mahendran et al. | 210/321.8 |
| 6,702,941 B1 | 3/2004 | Haq et al. | 210/315 |
| 6,706,180 B2 | 3/2004 | Kirker et al. | 210/232 |
| 6,706,189 B2 | 3/2004 | Rabie et al. | 210/636 |
| 6,708,957 B2 | 3/2004 | Cote et al. | 261/23.1 |
| 6,739,459 B1 | 5/2004 | Hartmann | 210/457 |
| 6,770,202 B1 | 8/2004 | Kidd et al. | 210/650 |
| 6,787,046 B2 | 9/2004 | De Kock et al. | 210/748 |
| 6,893,563 B2 * | 5/2005 | Grummert | 210/321.84 |
| 6,919,006 B2 * | 7/2005 | Ogle | 204/600 |
| 7,008,540 B1 | 3/2006 | Weavers et al. | 210/636 |
| 2002/0158008 A1 | 10/2002 | Kirker et al. | 210/512.1 |
| 2004/0016699 A1 | 1/2004 | Bayevsky | 210/636 |

FOREIGN PATENT DOCUMENTS

| | | | |
|---|---|---|---|
| FR | 870450 | 3/1942 | 14/6 |
| FR | 1038726 | 10/1953 | |
| FR | 2643268 | 2/1989 | |
| FR | 2647512 | 5/1989 | |
| GB | 2183059 | 5/1987 | |
| JP | 2307587 | 12/1990 | |
| JP | 11330379 | 10/1999 | |
| JP | 2001113204 A | 4/2001 | |

| | | |
|---|---|---|
| WO | WO 9747404 | 12/1997 |
| WO | 00/02663 | 1/2000 |
| WO | 02/42004 A1 | 5/2002 |

OTHER PUBLICATIONS

PCT International Search Report PCT/US04/32817, 13 pages, Mailing Date Jan. 19, 2005.

PCT International Search Report PCT/US04/24664, 10 pages, Mailing Date Mar. 3, 2005.

Notification concerning transmittal of copy of international preliminary report on patentability for PCT/US04/007384, 7 pages, Mailed Sep. 29, 2005.

International Search Report PCT/US 99/15891, 6 pages, Jul. 12, 1999.

International Search Report PCT/US 02/13186, Sep. 10, 2002.

International Search Report PCT/US 02/36830, 8 pages, Mar. 12, 2003.

International Search Report PCT/US04/07384, 11 pages, Mailed Sep. 15, 2004.

International Search Report for EP Application No. 04719722 (4 pages), Sep. 19, 2006.

Notification concerning transmittal of copy of international preliminary report on patentability for PCT/US04/024664, 7 pages, Mailed Feb. 9, 2006.

Notification concerning transmittal of copy of international preliminary report on patentability for PCT/US04/024661, 5 pages, Mailed Feb. 9, 2006.

Supplemental European Search Report for Application No. 04719722 (5 pages), Jan. 18, 2007.

PCT International Search Report PCT/US04/20528, 13 pages, Mailing Date Mar. 15, 2005.

European Search Report Communication, Application No. 04779659.4-1521, 3 pgs.

English Translation of German Patent DE 246696, 5 pages, date Mar. 13, 2010.

English Translation of German Patent DE 1755388, 13 pages, Oct. 31, 1957.

English Translation of German Patent DE 3409107, 20 pages, Sep. 26, 1985.

\* cited by examiner

FILTRATION SYSTEM AND DYNAMIC FLUID SEPARATION METHOD

CROSS REFERENCE TO RELATED APPLICATIONS

This application claims priority to U.S. Provisional Patent Application Ser. No. 60/491/581, filed Jul. 30, 2003, and entitled "Tensioned Leaf Filter Elements With Perpendicular Vibration."

This application also claims priority to U.S. Provisional Patent Application Ser. No. 60/491,579, filed Jul. 30, 2003, and entitled "Tensioned Stack Plate Filter With Perpendicular Vibration."

This application is related to copending U.S. patent application Ser. No. 10/902,881 filed Jul. 30, 2004, entitled "Filtration System with Enhanced Cleaning and Dynamic Fluid Separation."

TECHNICAL FIELD

This disclosure relates in general to the field of fluid separation, and more particularly to filtration systems and dynamic separation of a process fluid.

BACKGROUND OF THE INVENTION

An ongoing goal in the filtration industry is to perform filtration continuously for sustained periods, even when processing fluids with high amounts of solids or colloidal materials. A wide variety of filter media designs and configurations have been used in attempts to provide a continuous filtration process. This goal has led to several known techniques for continuously inhibiting the buildup of scale, cake or films which tend to deposit on and block passage of desired fluid flow through associated filter media. In some cases, these techniques are used intermittently, to perform what is called cyclic cleaning of filter media surfaces, usually when an associated filtration process has been suspended for such cleaning.

In order to achieve sufficient surface area to serve in commercial scale filtration applications, multiple layers of filter media such as flat sheet membranes are often collected together within a single filtration device. Combining a plurality of sheet membranes may include arranging them in parallel stacks, mounted either horizontally or vertically, or, winding a relatively long single sheet into a spiral configuration.

Various techniques for continuous and cyclic cleaning of associated filter media have been used. U.S. Pat. Nos. 4,872,988; 4,952,317; 5,014,564 and 5,725,767 teach using reciprocating torsional vibration applied parallel to planes of stacked filter elements. Flat filter leaf elements may be stacked within and rigidly attached to a pressure vessel, whereby the entire filtration device is torsionally shaken in a back and forth or reciprocating manner generally parallel to the face of the leaf elements and orbitally around a vertical axis through the center of the stack. These reciprocating orbital shaking motions may produce boundary layer turbulence or interference on upstream surfaces of each membrane or leaf element to continuously scour associated surfaces of any scaling, cake or film. In order to transmit and to withstand the relatively violent motions being applied by external vibration devices, the leaf elements may include a support mounted at an interior surface of the associated membrane. The membranes may be sealed or laminated to each other over a support element or plate. The support element may be constructed of a relatively rigid plastic material, metal or other suitable materials.

U.S. Pat. No. 6,322,698 teach vibratory cleaning by applying reciprocating torsional vibration parallel to the planes of stacked flat filter elements. The flat filter elements includes frame elements, multiply-stacked, with outer edges sealingly combine to form an integral pressure vessel. The entire stacked frame device may be torsionally shaken parallel to the planes of the filter elements. This shaking motion may produce boundary layer scouring for the purpose of preventing accumulation of surface scaling, caking or filming on upstream surfaces of associated filter media.

U.S. Pat. No. 6,287,467 teaches cleaning parallel mounted, flat leaf filter elements using air bubbles forcefully directed between and sweeping across the upstream surfaces of their filter leaf elements. A solid plate-like stiffening element may be disposed parallel to the filter media of each element to provide overall stiffness with desired spacing between upstream surfaces through which cleaning air bubbles are directed. Conventional filter element design and construction often includes rigid support structures with internal reinforcing plates and/or rigid mechanical elements disposed within the central work area of such filter elements

SUMMARY OF THE INVENTION

In accordance with teachings of the present invention a filtration system may be provided with a filter media having a central, open working portion operable to separate a process fluid into selected components and an outer, peripheral portion engaged with structural members of the filtration system. Various types of filter media incorporating teachings of the present invention may be used to form the filtration systems. Examples of such filter media include, but are not limited to, a single membrane sheet with desired porosity or permeability and a membrane envelope formed by two or more membrane layers with a spacer disposed therebetween. Single membrane sheets and/or membrane envelopes may be formed into substantially continuous rolls in accordance with teachings of the present invention. Single membrane sheets and/or membrane envelopes may also be formed as spiral wound rolls in accordance with teachings of the present invention.

For some applications an enclosing, outer support element supplies sufficient structure strength, while at the same time offering a unique ability for an associated membrane or flexible element to bounce. Alternatively, a sheet of membrane material may be anchored and tensioned across two or more points or edges along its periphery, and optionally, with such points or zones relatively movable in relation to one another, such that the amount of tension applied across the face of the membrane sheet may be varied, including during filtration.

Tensioned filter elements incorporating teachings of the present invention eliminate various types of strengthening, rigidifying and/or spacing members mounted parallel to and often blocking central areas of the membranes associated with prior plate filter elements. The present invention includes positioning membrane sheets, each tensioned on at least two points across a central workspace, which workspace is thereby left substantially open and free of mechanical obstructions. This method for assembling a filter element may be generally described as tensioning a filter element.

The present invention includes tensioning or anchoring filter media to maintain structural strength required for shape-holding. The present invention also maintains predetermined spacing between associated filter media which allows process fluid to communicate with upstream surfaces of associated filter media. The present invention allows permeate fluid to collect and flow generally uniformly within an inner space defined by any two layers of filter media.

One aspect of the present invention includes forming a filter element which allows an associated filter media to stretch, flex and/or bounce while exterior portions or periphery of the filter media remains securely anchored with other components of the filter element.

BRIEF DESCRIPTION OF THE DRAWINGS

A more complete and thorough understanding of the present invention and advantages thereof may be acquired by referring to the following descriptions taken in conjunction with the accompanying drawings, in which like reference numbers indicate like features, and wherein.

DETAILED DESCRIPTION OF THE INVENTION

Various embodiments of the invention and its advantages are best understood by reference to FIGS. 1-26 wherein like numbers refer to same and like parts.

Dynamic filtration may be defined as the use of membranes or other filter media capable of substantially continuous operation with either no interruption of an associated filtration process or substantially reduced frequency of cleaning that interrupts an otherwise substantially continuous filtration process.

Process fluid may generally be defined as a fluid stream containing liquids and/or gases along with suspended solids, colloidal and/or particulate matter. Fluid permeable membranes and other types of filter media may be used to separate selected components of a process fluid in accordance with teachings of the present invention.

Membranes and other types of filter media may have an upstream side, which is the side or face communicating with a process fluid. Membranes and other types of filter media generally have a downstream side communicating with clarified fluids removed from the process fluid. Clarified fluids may include liquids, gases, solids, particulate matter and/or colloidal matter which has been able to pass through or permeate an associated filter media. Clarified fluids may also be referred to as "permeate" or "permeate fluids".

Process fluids passing across the upstream side of a membrane or other filter media gradually loses associated liquid and/or gaseous components by permeating the filter media. The process fluid generally becomes relatively thicker with a higher concentration of solids, colloidal and/or particulate matter. The accumulation of these materials on the upstream side of a membrane or other filter media may be referred to as "retentate" or "concentrated fluid."

The term "filter media" may be used to include permeable membranes, sieves and any other filter material operable to separate a process fluid into selected components in accordance with teachings of the present invention. Filter media satisfactory for use with the present invention may be formed from woven materials, non-woven materials and perforated plastic films. Various types of filter media may be used based on desired characteristics such as ability of the filter media to separate liquids from gases and ability to separate suspended solids, colloidal and particulate matter from a fluid stream. Filter media may be selected with desired permeability or porosity for each application.

The term "fluid" may be used to include liquids, gases or a combination of liquids and gases.

The term "flux rate" may be used to define the rate at which a filter media separates retentate and clarified fluid from a process fluid.

The term "housing" may be used to include a container, tank, chamber, vessel, pressure vessel, cartridge, surrounding frame, plate frame system or any other structure suitable for holding filter media incorporating teachings of the present invention.

Figure 1:
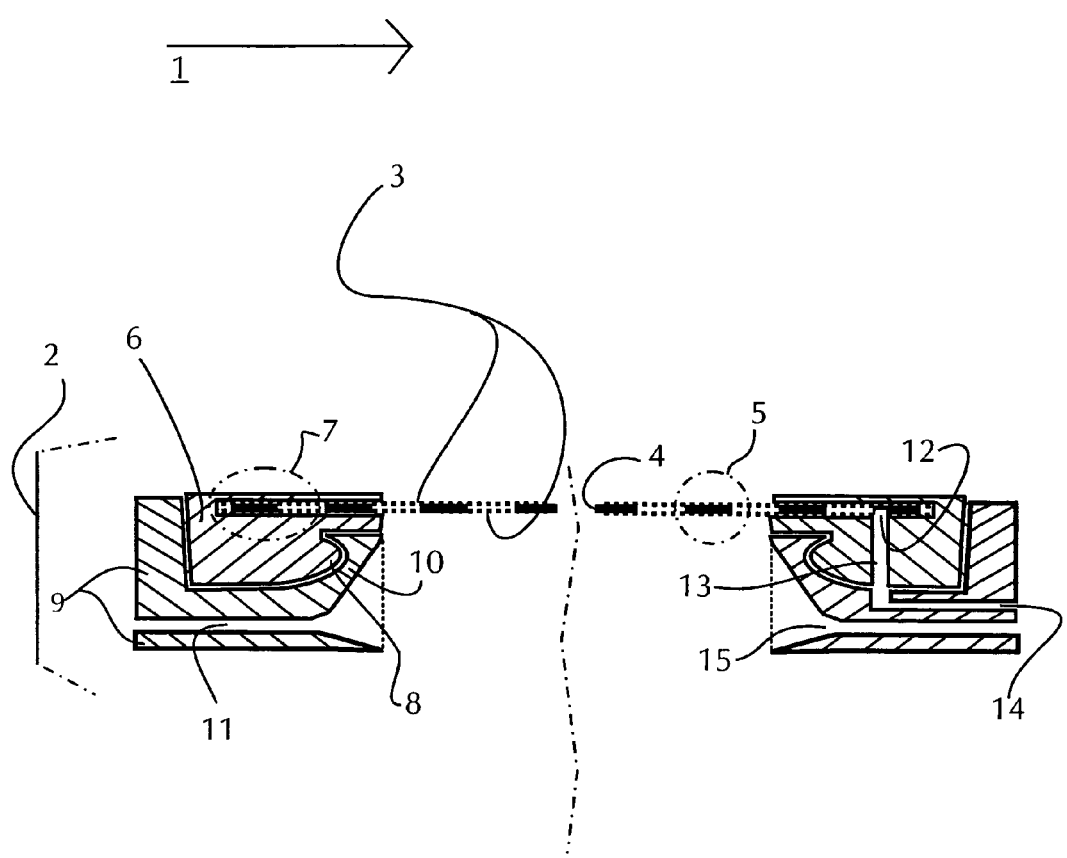
FIG. 1 is a schematic drawing in section with portions broken away showing one example of a filter element, membrane envelope and associated fluid flow paths formed in accordance with teachings of the present invention.

FIG. 1 shows a cut-away side view of one of several possible embodiments for constructing a filter element using a membrane tensioning device incorporating teachings of the present invention. In this embodiment, two symmetrical portions of a filter element are shown, representing relatively opposite segments of an enclosing element such as a ring or frame, of oval, rectangular or other shape, within which enclosing element membrane sheets may be anchored, tensioned and sealed. This embodiment shows one of several techniques for applying even tension around the periphery of a mounted sheet membrane, using a relatively compressible bulb or rib around the radius of a first ring or an inner mounting ring, which bulb or rib, when pressed into a groove-like depression in a second ring or relatively rigid outer ring, pulls outward uniformly on the membrane away from its center axis. This embodiment further depicts integral ingress or inlet for process fluid into a central area of the filter element, and egress or outlet for permeate fluid and retentate materials from the filter element, with all three such means relatively parallel in direction to the plane of the membranes.

Part 1 Direction of a process fluid flowing across the overall filter element (part 2).

Part 2 One embodiment of a single filter element constructed using the membrane tensioning method of construction, which element uses a compressible bulb, rib or other protrusion to provide tensioning, and which element provides for the lateral entry of the process fluid and the lateral exit of both a permeate and a retentate.

Part 3 Two membrane sheets adhered to outer peripheral ring or frame element at periphery to form a membrane envelope, sealingly joined to inner anchoring and tensioning member (part 6), with a membrane spacer (part 4) also sealingly joined therein, to form a relatively flexible membrane envelope, defining an enclosed inner space or chamber.

Part 4 Spacer or separation device disposed between the two membranes to maintain the membranes relatively apart from each other. The separation device or spacer freely allows communication of fluid in the space or chamber generally parallel to the two membrane sheets. Cross bleed cloth, netting or similar devices may be used to form such spacers.

The membrane sheets may be formed from wholly aromatic polyamide and other man made materials. In the field of nanofiltration, the membrane sheets may be formed from polysulfones and other man made materials. Internal separating elements or spacers disposed between the membrane sheets may be formed from nylon, urethane and other man made materials. Cellulose acetate, polyamides and polyimides may also be used to form membranes and other types of filter media satisfactory for use with the present invention.

Part 5 A flexible membrane envelope, comprising two relatively flexible membrane sheets (parts 2), space holding device (part 4) between said membranes, and sealing and anchoring devices around the periphery of the combination of parts.

Part 6 A compressible inner anchoring, tensioning and sealing member, such as a frame, ring or other surrounding and supporting element, communicating radially with all points of an outer anchoring and tensioning member (part 9), with an integral device for placing relatively uniform tension across the entire flexible membrane envelope (part 5), and with a compressible upward-facing sealing surface disposed horizontally along the top of said part 6, for providing a sealed joint between the top of part 6 and the bottom of a part 9 of an adjacent filter element.

Part 7 A structural and sealing joint between peripheral edges of the flexible membrane envelope (part 5) and the inner anchoring and tensioning member (part 6), with such joint achieved by bonding such as gluing, welding, ultrasonic or other vibratory joining or other adhering methods Part 8 Integral to part 6, a protruding compressible bulb or rib, facing inwards around the periphery of part 6.

Part 9 An outer anchoring and tensioning member, such as a frame, ring or other surrounding and supporting element, with which part 6 communicates.

Part 10 Integral to part 9, a radial space, slot or grove, cut, cast or molded into the top of part 9 as oriented in this figure, into which part 6 is inserted and pressed in a downwards direction, causing part 6 to expand laterally and relatively outwards from the center axis of the overall filter element (part 2), thus tensioning the single, integral assembly created by the previous joining of the flexible membrane envelope (part 2) with the compressible surrounding and supporting element (part 6), across the face of said envelope such that tensioning of the membrane sheets (part 3) together with the entire assembly provides structural strength to the filter element thus produced (part 2).

Part 11 One or more inlets into the filter element (part 2) for the ingress of the process fluid.

Part 12 One or more penetrations or openings through the face of a membrane (part 3), for the release of permeate fluid accumulating within said envelope.

Part 13. One or more passageways through inner supporting and tensioning element (part 6) and through outer supporting and tensioning element (part 9), to allow egress of accumulating permeate from the membrane envelope (part 5).

Part 14. One or more permeate outlets from the filter element (part 2).

Part 15. One or more outlets from the filter element (part 2) to permit the egress of the retentate materials accumulating on the outer surfaces of the tensioned membrane envelope (part 5).

Figure 2:
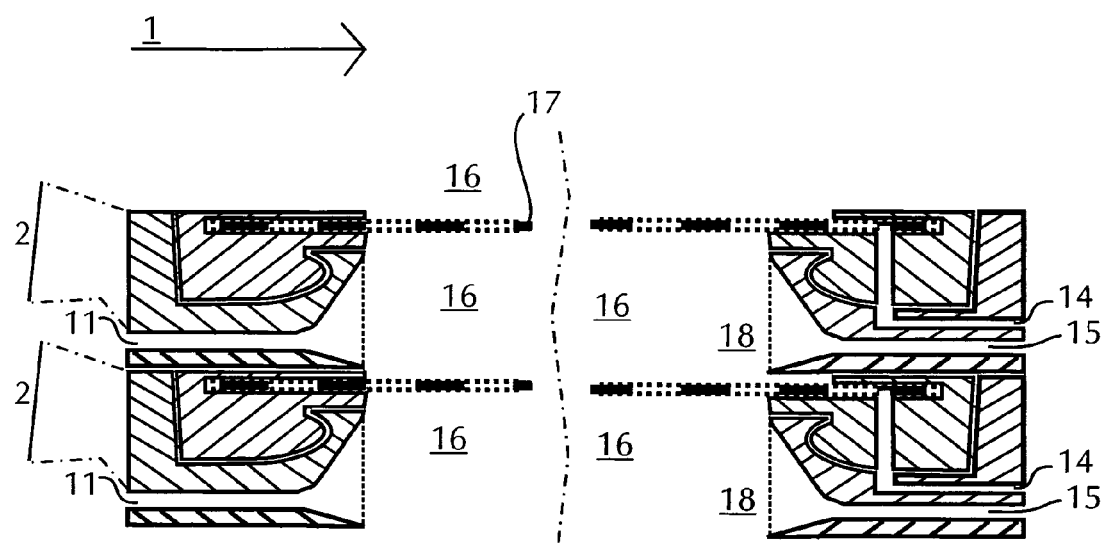
FIG. 2 is a schematic drawing in section with portions broken away showing two filter elements of FIG. 1 stacked relative to each other.

FIG. 2 shows a cut-away side view of two filter elements, each divided into two representative, relatively opposed outer segments, as embodied and constructed per FIG. 1, here shown stacked to indicate a plurality of such elements combined to maximize surface area within a filtration device or system.

Part 1 Direction of a process fluid flowing across the filter element (part 2).

Part 2 One embodiment of a single filter element constructed using a membrane tensioning device incorporating teachings of the present invention, which element uses a compressible bulb, rib or other protrusion to provide tensioning, and which element provides for the lateral entry of the process fluid and the lateral exit of both a permeate and a retentate.

Part 11 One or more inlets into the overall filter element (part 2) for the ingress of the process fluid.

Part 14. One or more permeate outlets from the filter element (part 2).

Part 15. One or more outlets from the filter element (part 2) to permit the egress of the retentate materials accumulating on the outer surfaces of the tensioned membrane envelope (part 5).

Part 16. Area or zone in which the process fluid communicates with the tensioned membrane envelope (part 5), with such fluid being sealingly contained by the outer anchoring and tensioning elements (parts 6 and 9), and with such fluid additionally communicating with means of ingress for such fluid (parts 11), and also communicating paths for egress of process fluid transformed into retentate, due to the loss of substantial quantities of liquid and/or gas permeating into and through the membrane envelope (part 5).

Part 17 Area or zone or chamber between the two membrane sheets (parts 3), sealingly formed into a tensioned membrane envelope (part 5), wherein liquid, gaseous and/or particulate components able to permeate the membrane, also called the permeate, accumulate through the filtration operation.

Part 18 Area or zone in which the retentate being formed by the loss of its permeable fluid components, accumulates toward the far side of the filter element (part 1), that being the side of said element most remote from the process fluid inlets (parts 11).

Figure 3:
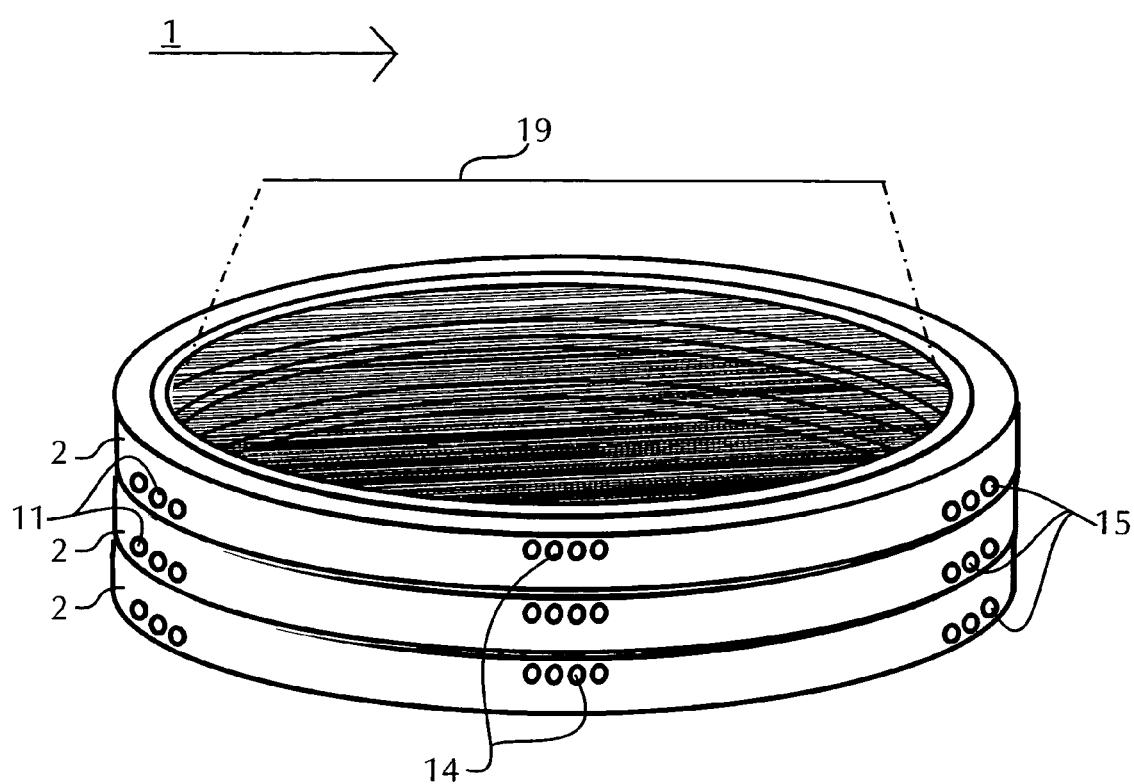
FIG. 3 is a schematic drawing showing an isometric view with portions broken away of three filter elements stacked relative to each other with open working areas of respective filter media generally aligned in accordance with teachings of the present invention.

FIG. 3 shows a top perspective view of three filter elements, shown in their entirety, and as embodied and constructed per FIG. 1, here again shown stacked to indicate a plurality of such elements combined to maximize surface area within a filtration device, and further illustrating possible locations for process fluid inlets, and permeate and retentate fluid outlets.

Part 1 Direction of a process fluid flowing across the overall filter element (part 2).

Part 2 One embodiment of a single filter element constructed using the membrane tensioning device, which element uses a compressible bulb, rib or other protrusion to provide tensioning, and which element provides for the lateral entry of the process fluid and the lateral exit of both a permeate fluid and a retentate fluid.

Part 11 One or more inlets into the overall filter element (part 2) for the ingress of the process fluid.

Part 14. One or more permeate outlets from the filter element (part 2).

Part 15. One or more outlets from the filter element (part 2) to permit the egress of retentate materials accumulating on the outer surfaces of the tensioned membrane envelope (part 5).

Part 19 Central membrane surface work areas of each of the filter elements (parts 2), which central work areas are relatively and substantially open, not being restricted or obstructed by mechanical support or spacing members.

Figure 4:
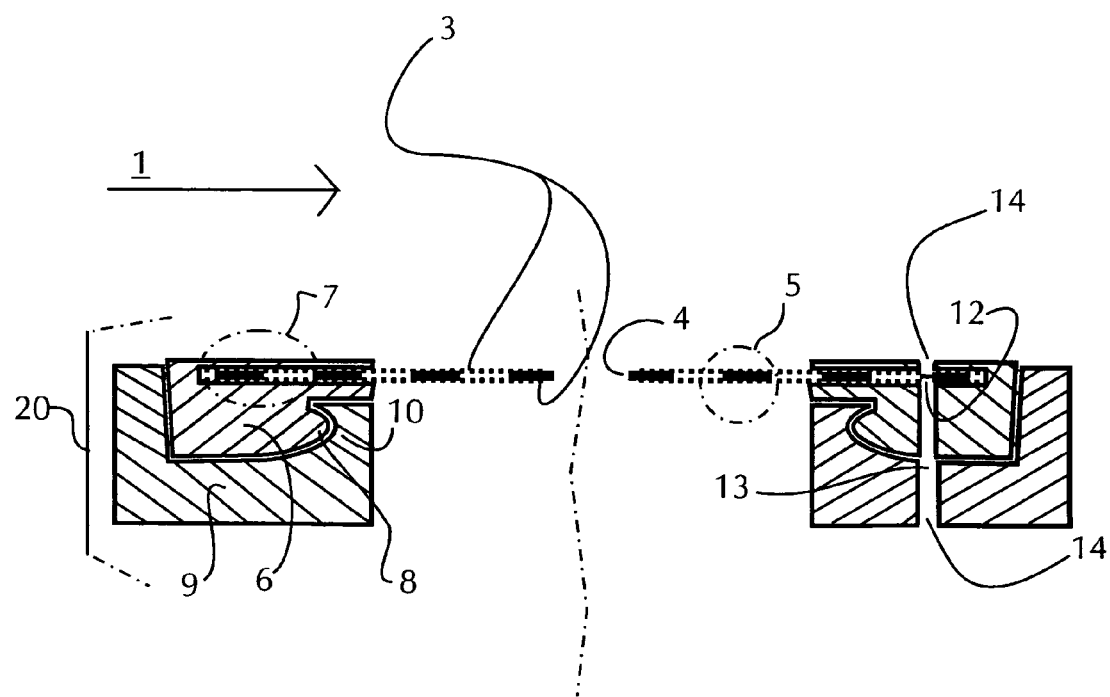
FIG. 4 is a schematic drawing in section with portions broken away showing a filter element with alternative fluid flow paths incorporating teachings of the present invention.
Figure 6:
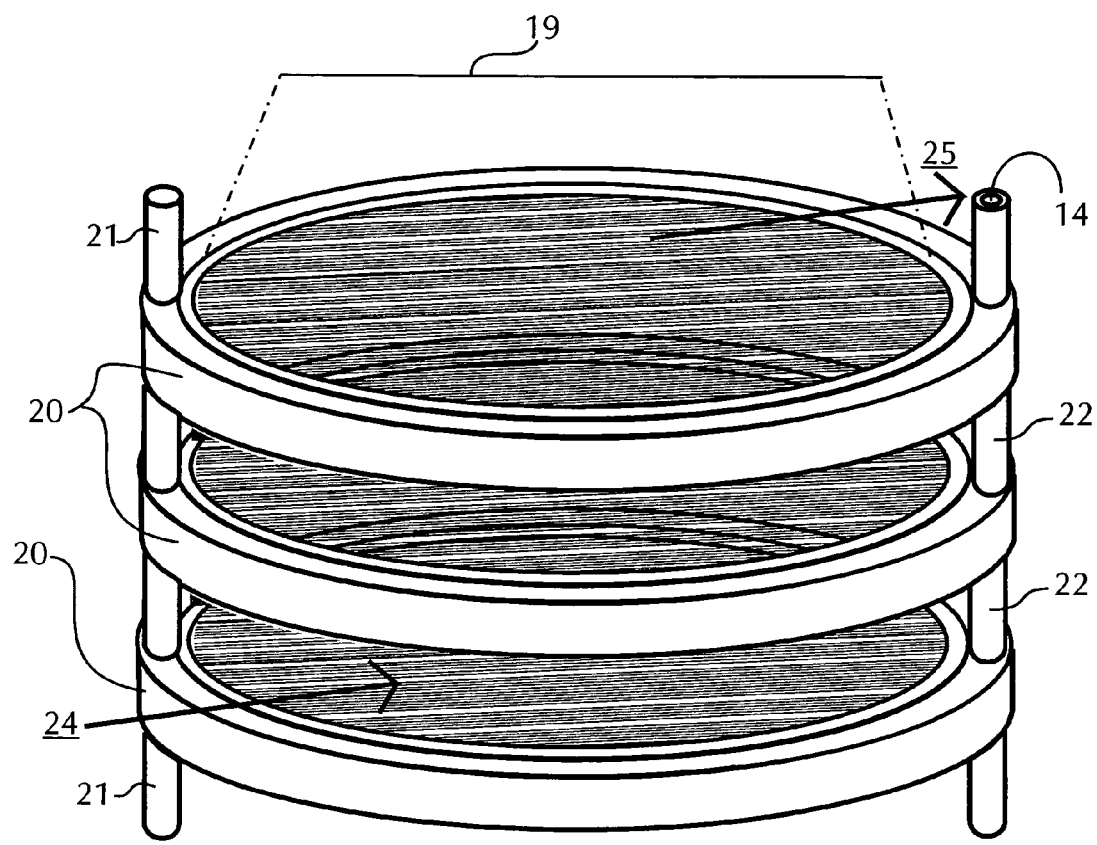
FIG. 6 is a schematic drawing showing an isometric view with portions broken away of three filter elements stacked relative to each other with associated filter media and fluid flow paths generally aligned in accordance with teachings of the present invention.

FIG. 4 shows a cut-away side view of another embodiment of a filter element using a membrane tensioning device incorporating teachings of the present invention. In this embodiment, two symmetrical portions of a filter element are shown, representing relatively opposite segments of an enclosing element such as a ring or frame, of oval, rectangular or other shape, within which enclosing element membrane sheets may be anchored, tensioned and sealed. This embodiment includes a device for applying even tension around the periphery of a mounted sheet membrane from FIG. 1, using a relatively compressible bulb or rib around the radius of an inner mounting ring, which bulb or rib, when pressed into a groove like depression in a relatively rigid outer ring, pulls outward uniformly on the membrane away from its center axis. However, only an egress flow path for permeate fluid accumulating within the tensioned membrane envelope is shown. Process fluid ingress and retentate egress flow paths for this embodiment are shown in FIG. 6.

Part 1 Direction of a process fluid flowing across the overall filter element (part 2).

Part 3 Two membrane sheets adhered to outer peripheral ring or frame element at periphery to form a membrane envelope, sealingly joined to inner anchoring and tensioning member (part 6), with a membrane spacer (part 4) also sealingly joined therein, to form a relatively flexible membrane envelope, defining an enclosed inner space or chamber.

Part 4 Spacer or space holding device disposed between the two membranes to maintain the membranes relatively apart from each other. The separation or spacer freely allows the travel of fluid in the space or chamber thereby maintained, parallel to the two membrane sheets, such as cross bleed cloth, netting or similar devices.

Part 5 A flexible membrane envelope, comprising two relatively flexible membrane sheets (parts 2), space holding device (part 4) between said membranes, and sealing and anchoring devices around the periphery of the combination of parts.

Part 6 A compressible inner anchoring and tensioning member, such as a frame, ring or other surrounding and supporting element, communicating radially with all points of an outer anchoring and tensioning member (part 9), with integral means for placing relatively uniform tension across the entire flexible membrane envelope (part 5).

Part 7 A structural and sealing joint between peripheral edges of the flexible membrane envelope (part 5) and the inner anchoring and tensioning member (part 6), with such joint achieved by means such as gluing, welding, ultrasonic or other vibratory joining or other adhering methods Part 8 Integral to part 6, a protruding compressible bulb or rib, facing inwards around the periphery of part 6.

Part 9 An outer anchoring and tensioning member, such as a frame, ring or other surrounding and supporting element, with which part 6 communicates.

Part 10 Integral to part 9, a radial space, slot or grove, cut, cast or molded into the top of part 9 as oriented in this figure, into which part 6 is inserted and pressed in a downwards direction, causing part 6 to expand laterally and relatively outwards from the center axis of the overall filter element (part 2), thus tensioning the single, integral assembly created by the previous joining of the flexible membrane envelope (part 2) with the compressible surrounding and supporting element (part 6), across the face of said envelope such that tensioning of the membrane sheets (part 3) together with the entire assembly provides structural strength to the filter element thus produced (part 2).

Part 12 One or more penetrations or openings through the face of a membrane (part 3), for the release of permeate fluid accumulating within said envelope.

Part 13. One or more passageways through inner supporting and tensioning element (part 6) and through outer supporting and tensioning element (part 9), to allow egress of accumulating permeate from the membrane envelope (part 5).

Part 14. One or more permeate outlets from the filter element (part 2).

Part 20 Another embodiment of a single filter element constructed using the membrane tensioning method of construction, which element uses a compressible bulb, rib or other protrusion to provide tensioning, and which element is constructed to be mounted with open spaces between elements (see FIG. 5) with said spaces to allow for the entry of the process fluid and the exit of the retentate, and with provision for vertical egress of accumulating permeate fluid from the interior of the tensioned membrane envelope (part 5).

Figure 5:
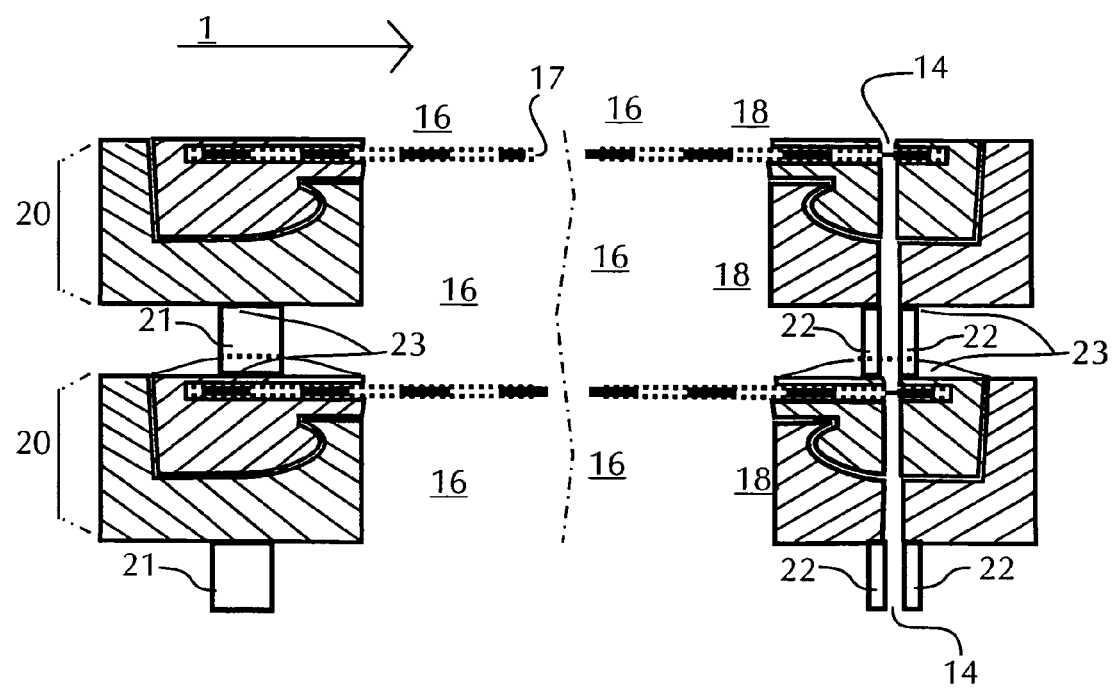
FIG. 5 is a schematic drawing in section with portions broken away showing two filter elements of FIG. 4 stacked relative to each other.

FIG. 5 shows a cut-away side view of two filter elements, each divided into two representative, relatively opposed outer segments, as embodied and constructed per FIG. 4, here shown stacked to indicate a plurality of such elements combined to maximize surface area within a filtration device.

Part 1 Direction of a process fluid flowing across the overall filter element (part 20).

Part 14. One or more permeate outlets from the filter element (part 20).

Part 16. Area or zone in which the process fluid communicates with the tensioned membrane envelope (part 5), and with such fluid additionally communicating with means of ingress for such fluid (parts 11), and also communicating means of egress for such process fluid mix as is transformed into the retentate, due to the loss of substantial quantities of its liquid permeating into and through the membrane envelope (part 5).

Part 17 Area or zone between the two membrane sheets (parts 3), sealingly formed into a tensioned membrane envelope (part 5), wherein those relatively liquid components able to permeate the membrane, also called the permeate, accumulate through the filtration operation.

Part 18 Area or zone in which the retentate being formed by the loss of its permeable fluid components, accumulates toward the far side of the filter element (part 1), that being the side of said element most remote from the process fluid inlets (parts 11).

Part 20 Another embodiment of a single filter element constructed using the membrane tensioning method of construction, which element uses a compressible bulb, rib or other protrusion to provide tensioning, and which element is constructed to be mounted with open spaces between elements (see FIG. 5) with said spaces to allow for the entry of the process fluid and the exit of the retentate, and with provision for vertical egress of accumulating permeate fluid from the interior of the tensioned membrane envelope (part 5).

Part 21 Spacing member serving to separate multiple stacked filter elements in this embodiment from one another.

Part 22 Spacing, support and permeate exit passageway tubing member serving the same separation and support function as part 21, but additionally providing a hollow central channel or passage for the egress of permeate from all of the tensioned membrane envelopes out of the plurality of filter elements (parts 20).

Part 23 Sealing means between parts 22 and 9, and between parts 22 and 6, and sealing means between parts 23 and 9 and parts 23 and 6.

FIG. 6 shows a top perspective view of three filter elements, shown in their entirety, and as embodied and constructed per FIG. 4, here again shown stacked to indicate a plurality of such elements combined to maximize surface area within a filtration device. Spacing provided between each of the filter elements, parallel to its membrane surfaces, and shown here in exaggerated vertical scale, permits the ingress of process fluid, from the left as drawn in FIG. 6, across the membrane surfaces, and resulting in the accumulation of relatively de-liquefied retentate toward the right side of the membrane elements as drawn. At the right edges of each filter element, this retentate leaves the filter element for removal. Permeate accumulating within each of the tensioned membrane envelopes is captured by one or more relatively vertical passages, each of which sealingly penetrates through each membrane surface into the interior of each envelope.

Part 14. One or more permeate outlets from the filter element (part 20).

Part 19 Central membrane surface work areas of each of the filter elements (parts 20), which central work areas are relatively and substantially open, not being restricted or obstructed by mechanical support or spacing members.

Part 20 Another embodiment of a single filter element constructed using the membrane tensioning method of construction, which element uses a compressible bulb, rib or other protrusion to provide tensioning, and which element is constructed to be mounted with open spaces between elements (see FIG. 5) with said spaces to allow for the entry of the process fluid and the exit of the retentate, and with provision for vertical egress of accumulating permeate fluid from the interior of the tensioned membrane envelope (part 5).

Part 21 Spacing member serving to separate multiple stacked filter elements in this embodiment from one another.

Part 22 Spacing, support and permeate exit passageway tubing member serving the same separation and support function as part 21, but additionally providing a hollow central channel or passage for the egress of permeate from all of the tensioned membrane envelopes out of the plurality of filter elements (parts 20).

Part 24 Direction of process flow into and across this embodiment of a filter element utilizing the tensioning membranes method of construction. Open spaces between filter elements (parts 20), shown here exaggerated in vertical scale, serve as ingress means for the process fluid.

Part 25 Direction of retentate flow as it thickens and accumulates during its travel across the tensioned membrane envelope filter elements (parts 20). The open spaces (shown here exaggerated in vertical scale) between filter elements (parts 20) toward the right-hand side of a device as show in this figure, serve as egress means for the relatively de-liquefied retentate.

Figure 7:
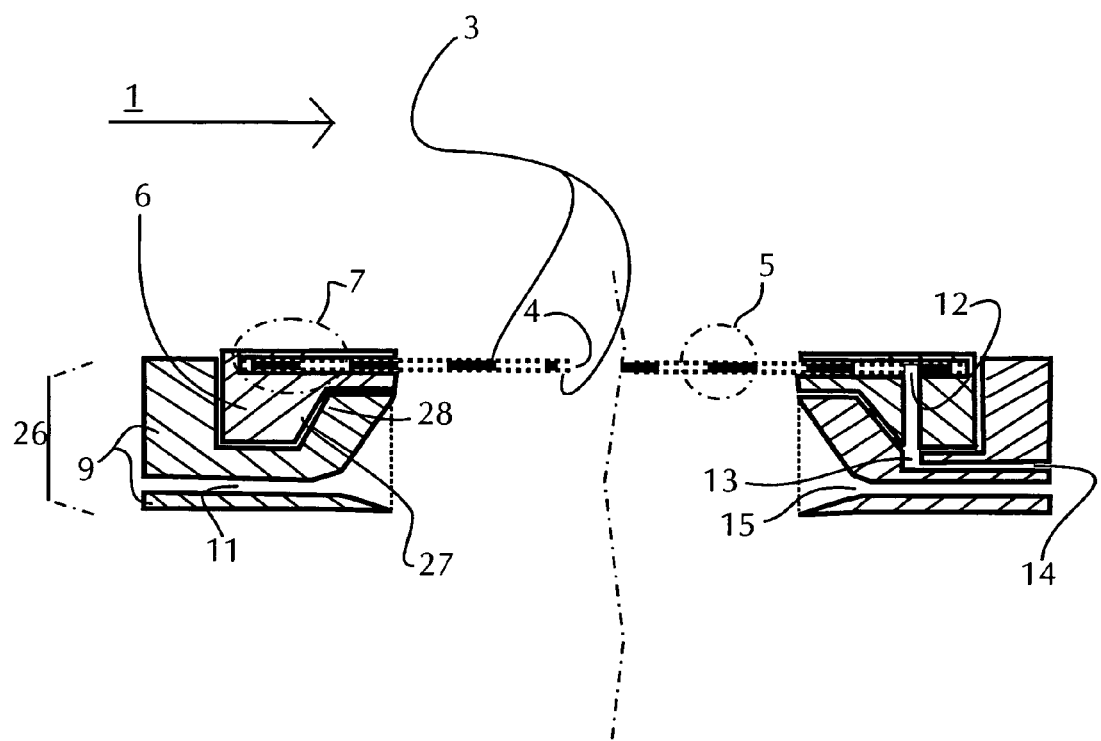
FIG. 7 is a schematic drawing in section with portions broken away showing a filter element with alternative fluid flow paths formed in accordance with teachings of the present invention.

FIG. 7 shows a cut-away side view another possible embodiment for constructing a filter element using the membrane tensioning device incorporating teachings of the present invention. In this embodiment, two symmetrical portions of a filter element are shown, representing relatively opposite segments of an enclosing element such as a ring or frame, of oval, rectangular or other shape, within which enclosing element membrane sheets may be anchored, tensioned and sealed. This embodiment shows another of several means for applying even tension around the periphery of a mounted sheet membrane, using two mated, parallel sloped surfaces, one on an inner anchoring ring lining up with the other on a relatively rigid outer ring, which when combined, exerts outward uniform tensioning pressure on the membrane away from its center axis. This embodiment further depicts integral ingress flow path for process fluid into the central area of the filter element, and egress flow path for permeate fluid and retentate materials from the filter element, with each flow path relatively parallel in direction to the plane of the membranes.

Part 1 Direction of a process fluid flowing across the overall filter element (part 2).

Part 3 Two membrane sheets adhered to outer peripheral ring or frame element at periphery to form a membrane envelope, sealingly joined to inner anchoring and tensioning member (part 6), with membrane spacing means (part 4) also sealingly joined therein, to form a relatively flexible membrane envelope, defining an enclosed inner space.

Part 4 Spacer or space holding device disposed between the two membranes to maintain the membranes relatively apart from each other. The separation or spacer freely allows the travel of fluid in the space or chamber thereby maintained, parallel to the two membrane sheets, such as cross bleed cloth, netting or similar devices.

Part 5 A flexible membrane envelope, comprising two relatively flexible membrane sheets (parts 2), space holding device (part 4) between said membranes, and sealing and anchoring devices around the periphery of the combination of parts.

Part 6 A compressible inner anchoring and tensioning member, such as a frame, ring or other surrounding and supporting element, communicating radially with all points of an outer anchoring and tensioning member (part 9), with integral means for placing relatively uniform tension across the entire flexible membrane envelope (part 5).

Part 7 A structural and sealing joint between peripheral edges of the flexible membrane envelope (part 5) and the inner anchoring and tensioning member (part 6), with such joint achieved by means such as gluing, welding, ultrasonic or other vibratory joining or other adhering methods Part 9 An outer anchoring and tensioning member, such as a frame, ring or other surrounding and supporting element, with which part 6 communicates.

Part 11 One or more inlets into the overall filter element (part 26) for the ingress of the process fluid.

Part 12 One or more penetrations or openings through the face of a membrane (part 3), for the release of permeate fluid accumulating within said envelope.

Part 13. One or more passageways through inner supporting and tensioning element (part 6) and through outer supporting and tensioning element (part 9), to allow egress of accumulating permeate from the membrane envelope (part 5).

Part 14. One or more permeate outlets from the filter element (part 26).

Part 15. One or more outlets from the filter element (part 26) to permit the egress of the retentate materials accumulating on the outer surfaces of the tensioned membrane envelope (part 5).

Part 26 Another embodiment of a filter element constructed using the tensioning membrane method of construction, wherein the tension applied to the membrane sheets (parts 3) is provided by mated sloped surfaces cut or cast radially around into the peripheries of parts 9 and 11. In this embodiment of said filter element (part 26), lateral inlet means are provided for the ingress of process fluid and the lateral exit means are provided for both permeate and a retentate materials.

Part 27 Integral to part 9, a sloped surface or grove, cut, cast or molded into the top of part 9 as oriented in this figure, into which part 6 is inserted and pressed in a downwards direction, causing part 6 to expand laterally and relatively outwards from the center axis of the overall filter element (part 26), thus tensioning the single, integral assembly created by the previous joining of the flexible membrane envelope (part 26) with the compressible surrounding and supporting element (part 6), across the face of said envelope such that tensioning of the membrane sheets (part 3) together with the entire assembly provides structural strength to the filter element thus produced (part 26).

Part 28 Integral to part 6, a sloped surface cut or cast into part 6 so as to be substantially parallel to the sloped surface (part 27) on part 9, and running around the periphery of part 6.

Figure 8:
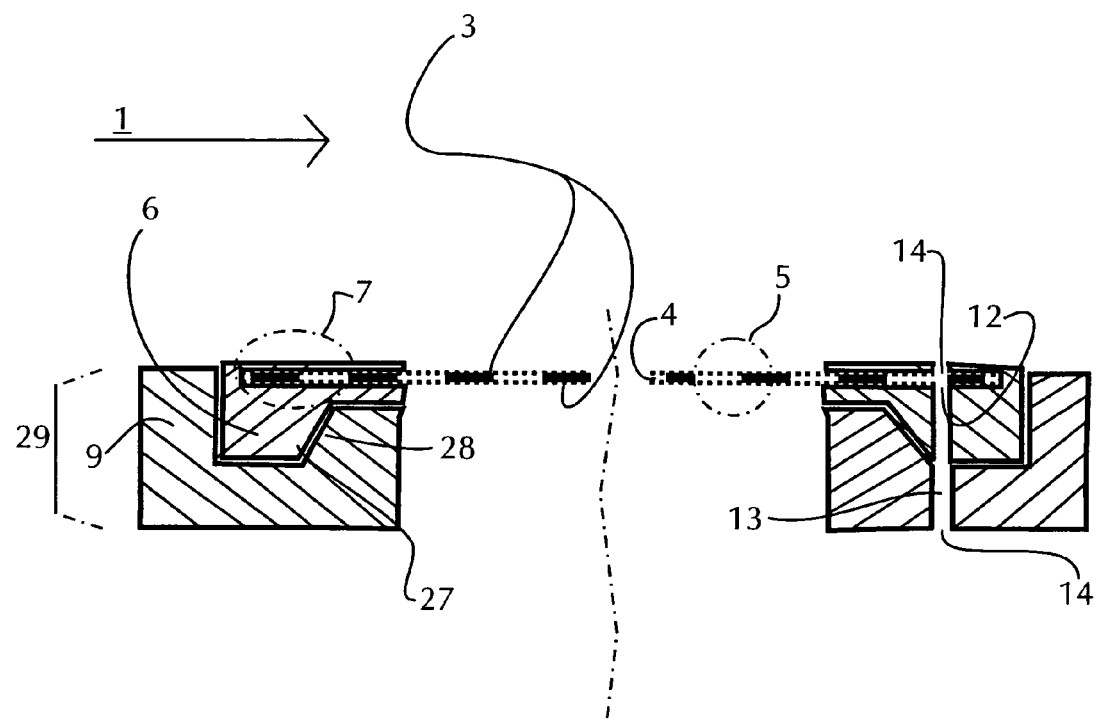
FIG. 8 is a schematic drawing in section with portions broken away showing another example of a filter element and associated fluid flow paths formed in accordance with teachings of the present invention.

FIG. 8 shows a cut-away side view of another possible embodiment for constructing a filter element using the membrane tensioning device incorporating teachings of the present invention. In this embodiment, two symmetrical portions of a filter element are shown, representing relatively opposite segments of an enclosing element such as a ring or frame, of oval, rectangular or other shape, within which enclosing element membrane sheets may be anchored, tensioned and sealed. This embodiment shows another of several techniques for applying even tension around the periphery of a mounted sheet membrane, using a two mated, parallel sloped surfaces, one on an inner anchoring ring lining up with the other on a relatively rigid outer ring, which when combined, exerts outward uniform tensioning pressure on the membrane away from its center axis.

As with the embodiment shown in FIG. 6, spacing is provided between each of the filter elements, parallel to its membrane surfaces, and shown here in exaggerated vertical scale. These horizontal spaces or zones permit the ingress of process fluid, from the left as drawn in FIG. 6, across the membrane surfaces, and result in the accumulation of relatively de-liquefied retentate toward the right side of the membrane elements as drawn. At the right edges of each filter element, this retentate leaves the filter element for removal. Permeate accumulating within each of the tensioned membrane envelopes is captured by one or more relatively vertical passages, each of which sealingly penetrates through each membrane surface into the interior of each envelope.

Part 1 Direction of a process fluid flowing across the overall filter element (part 29).

Part 3 Two membrane sheets adhered to outer peripheral ring or frame element at periphery to form a membrane envelope, sealingly joined to inner anchoring and tensioning member (part 6), with membrane spacing means (part 4) also sealingly joined therein, to form a relatively flexible membrane envelope, defining an enclosed inner space.

Part 4 Spacer or space holding device disposed between the two membranes to maintain the membranes relatively apart from each other. The separation or spacer freely allows the travel of fluid in the space or chamber thereby maintained, parallel to the two membrane sheets, such as cross bleed cloth, netting or similar devices.

Part 5 A flexible membrane envelope, comprising two relatively flexible membrane sheets (parts 2), space holding device (part 4) between said membranes, and sealing and anchoring devices around the periphery of the combination of parts.

Part 6 A compressible inner anchoring and tensioning member, such as a frame, ring or other surrounding and supporting element, communicating radially with all points of an outer anchoring and tensioning member (part 9), with integral means for placing relatively uniform tension across the entire flexible membrane envelope (part 5).

Part 7 A structural and sealing joint between peripheral edges of the flexible membrane envelope (part 5) and the inner anchoring and tensioning member (part 6), with such joint achieved by means such as gluing, welding, ultrasonic or other vibratory joining or other adhering methods Part 9 An outer anchoring and tensioning member, such as a frame, ring or other surrounding and supporting element, with which part 6 communicates.

Part 12 One or more penetrations or openings through the face of a membrane (part 3), for the release of permeate fluid accumulating within said envelope.

Part 13. One or more passageways through inner supporting and tensioning element (part 6) and through outer supporting and tensioning element (part 9), to allow egress of accumulating permeate from the membrane envelope (part 5).

Part 14. One or more permeate outlets from the filter element (part 29).

Part 27 Integral to part 9, a sloped surface or grove, cut, cast or molded into the top of part 9 as oriented in this figure, into which part 6 is inserted and pressed in a downwards direction, causing part 6 to expand laterally and relatively outwards from the center axis of the overall filter element (part 2), thus tensioning the single, integral assembly created by the previous joining of the flexible membrane envelope (part 2) with the compressible surrounding and supporting element (part 6), across the face of said envelope such that tensioning of the membrane sheets (part 3) together with the entire assembly provides structural strength to the filter element thus produced (part 29).

Part 28 Integral to part 6, a sloped surface cut or cast into part 6 so as to be substantially parallel to the sloped surface (part 27) on part 9, and running around the periphery of part 6.

Part 29 Another embodiment of a filter element constructed using the tensioning membrane method of construction, wherein the tension applied to the membrane sheets (parts 3) is provided by mated sloped surfaces cut or cast radially around and into the peripheries of parts 9 and 6. In this embodiment of said filter element (part 29), spacing between the individual filter elements (parts 29) provides means for the ingress process fluid, flow of said process fluid in a relatively single direction across the faces of the membranes (parts 3) and tensioned membrane envelopes (parts 5), and also for the exit of relatively de-liquefied and thickened retentate at the right side of part 29, as shown in this figure. Also as shown in the figure are vertical means of egress for the permeate materials collected within the tensioned membrane envelopes (parts 5).

Figure 9:
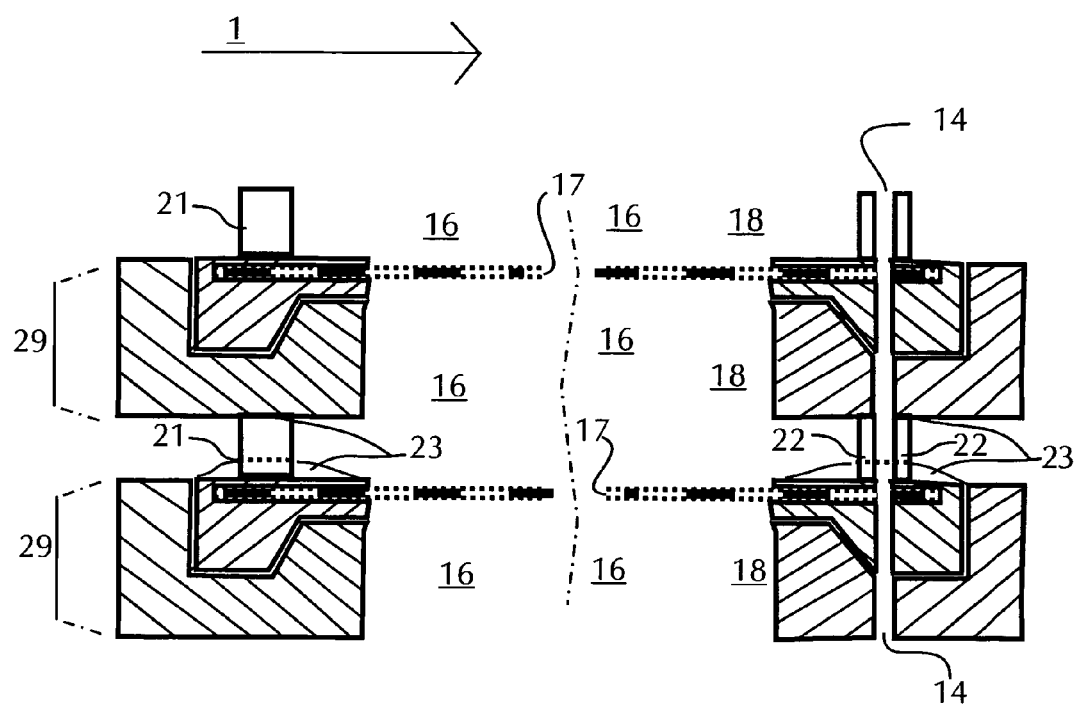
FIG. 9 is a schematic drawing in section with portions broken away showing two filter elements of FIG. 8 stacked relative to each other.

FIG. 9 shows a cut-away side view of two filter elements, each divided into two representative, relatively opposed outer segments, as embodied and constructed per FIG. 7, here shown stacked to indicate a plurality of such elements combined to maximize surface area within a filtration device.

Part 1 Direction of a process fluid flowing across the overall filter element (part 2).

Part 14. One or more permeate outlets from the filter element (part 29).

Part 16. Area or zone in which the process fluid communicates with the tensioned membrane envelope (part 5), with such fluid being sealingly contained by the outer anchoring and tensioning elements (parts 6 and 9), and with such fluid additionally communicating with means of ingress for such fluid (parts 11), and also communicating means of egress for such process fluid mix as is transformed into the retentate, due to the loss of substantial quantities of its liquid permeating into and through the membrane envelope (part 5).

Part 17 Area or zone between the two membrane sheets (parts 3), sealingly formed into a tensioned membrane envelope (part 5), wherein those relatively liquid components able to permeate the membrane, also called the permeate, accumulate through the filtration operation.

Part 18 Area or zone in which the retentate being formed by the loss of its permeable fluid components, accumulates toward the far side of the filter element (part 1), that being the side of said element most remote from the process fluid inlets (parts 11).

Part 21 Spacing member serving to separate multiple stacked filter elements in this embodiment from one another.

Part 22 Spacing, support and permeate exit passageway tubing member serving the same separation and support function as part 21, but additionally providing a hollow central channel or passage for the egress of permeate from all of the tensioned membrane envelopes out of the plurality of filter elements (parts 29).

Part 23 Sealing means between parts 22 and 9, and between parts 22 and 6, and sealing means between parts 23 and 9 and parts 23 and 6.

Part 29 Another embodiment of a filter element constructed using the tensioning membrane method of construction, wherein the tension applied to the membrane sheets (parts 3) is provided by mated sloped surfaces cut or cast radially around into the peripheries of parts 9 and 6. In this embodiment of said filter element (part 26), spacing between the individual filter elements (parts 29) provides means for the ingress process fluid, flow of said process fluid in a relatively single direction across the faces of the membranes (parts 3) and tensioned membrane envelopes (parts 5), and also for the exit of relatively de-liquefied and thickened retentate at the right side of part 29, as shown in this figure.

Also as shown in the figure are vertical means of egress for the permeate materials collected within the tensioned membrane envelopes (parts 5).

Figure 10:
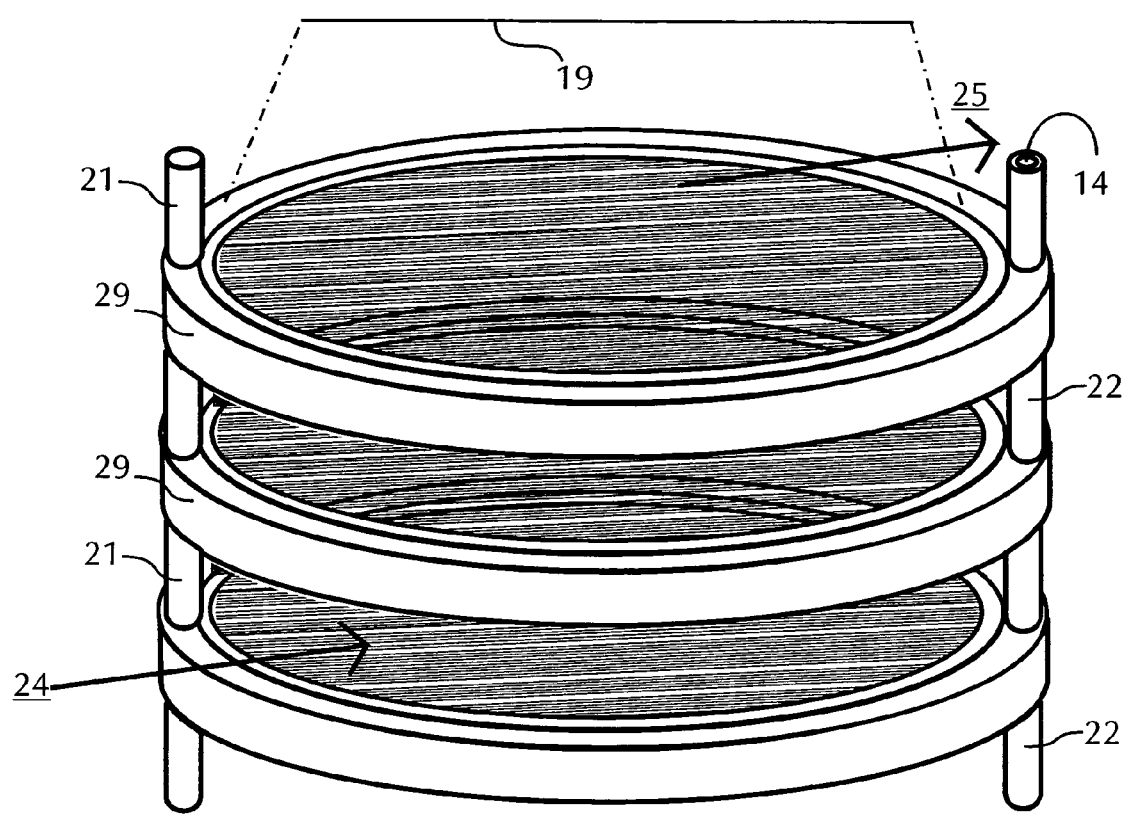
FIG. 10 is a schematic drawing showing an isometric view with portions broken away of three filter elements stacked relative to each other with associated filter media and fluid flow paths generally aligned in accordance with teachings of the present invention.

FIG. 10 shows a top perspective view of three filter elements, shown in their entirety, and as embodied and constructed per FIG. 8, here again shown stacked to indicate a plurality of such elements combined to maximize surface area within a filtration device. Spacing provided between each of the filter elements, parallel to its membrane surfaces, and shown here in exaggerated vertical scale, permits the ingress of process fluid, from the left as drawn in FIG. 10, across the membrane surfaces, and resulting in the accumulation of relatively de-liquefied retentate toward the right side of the membrane elements as drawn. At the right edges of each filter element, this retentate leaves the filter element for removal. Permeate accumulating within each of the tensioned membrane envelopes is captured by one or more relatively vertical passages, each of which sealingly penetrates through each membrane surface into the interior of each envelope.

Part 14. One or more permeate outlets from the filter element (part 29).

Part 19 Central membrane surface work areas of each of the filter elements (parts 20), which central work areas are relatively and substantially open, not being restricted or obstructed by mechanical support or spacing members.

Part 21 Spacing member serving to separate multiple stacked filter elements in this embodiment from one another.

Part 22 Spacing, support and permeate exit passageway tubing member serving the same separation and support function as part 21, but additionally providing a hollow central channel or passage for the egress of permeate from all of the tensioned membrane envelopes out of the plurality of filter elements (parts 20).

Part 24 Direction of process flow into and across this embodiment of a filter element utilizing the tensioning membranes method of construction. Open spaces between filter elements (parts 20), shown here exaggerated in vertical scale, serve as ingress means for the process fluid.

Part 25 Direction of retentate flow as it thickens and accumulates during its travel across the tensioned membrane envelope filter elements (parts 20). The open spaces (shown here exaggerated in vertical scale) between filter elements (parts 20) toward the right-hand side of a device as show in this figure, serve as egress means for the relatively de-liquefied retentate.

Part 29 Another embodiment of a filter element constructed using the tensioning membrane method of construction, wherein the tension applied to the membrane sheets (parts 3) is provided by mated sloped surfaces cut or cast radially around into the peripheries of parts 9 and 6 In this embodiment of said filter element (part 26), spacing between the individual filter elements (parts 29) provides flow paths for the ingress process fluid, flow of said process fluid in a relatively single direction across the faces of the membranes (parts 3) and tensioned membrane envelopes (parts 5), and also for the exit of relatively de-liquefied and thickened retentate at the right side of part 29, as shown in this figure. Also as shown in the figure are vertical flow paths for egress for the permeate materials collected within the tensioned membrane envelopes (parts 5).

Figure 11:
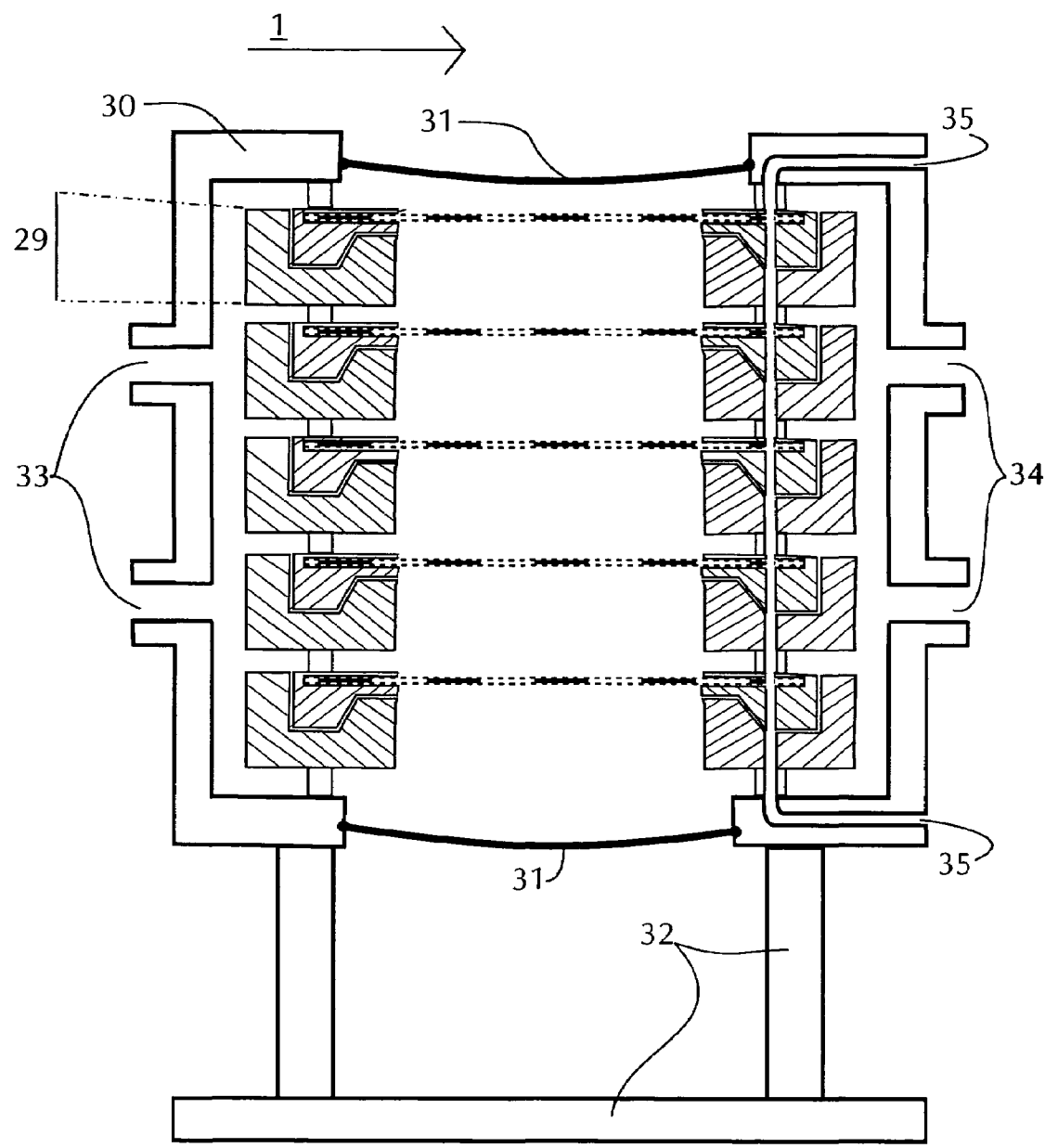
FIG. 11 is a schematic drawing in section with portions broken away showing one example of a filtration system having filter elements and fluid flow paths formed in accordance with teachings of the present invention.

FIG. 11 shows a cut-away side view of an entire dynamic or continuous filtration device, incorporated using a plurality of stacked individual filter elements constructed using the tensioned membrane method of construction of the present invention. This entire device embodiment is provided to suggest the practicality of overall construction of the method, and also to show some of many means to provide for the ingress of process fluid into an overall device and the egress of both accumulated permeate fluid and retentate materials from such an overall device.

Part 1 Direction of a process fluid flowing across the overall filter element (part 29).

Part 29 Embodiment of a filter element constructed using the tensioning membrane method of construction, wherein the tension applied to the membrane sheets (parts 3) is provided by mated sloped surfaces cut or cast radially around into the peripheries of parts 9 and 6. In this embodiment of said filter element (part 29), spacing between the individual filter elements (parts 29) provides means for the ingress process fluid, flow of said process fluid in a relatively single direction across the faces of the membranes (parts 3) and tensioned membrane envelopes (parts 5), and also for the exit of relatively de-liquefied and thickened retentate at the right side of part 29, as shown in this figure. Also as shown in the figure are vertical means of egress for the permeate materials collected within the tensioned membrane envelopes (parts 13 as shown in FIG. 7).

Part 30 A containment vessel for mounting a plurality of the filter elements, and optionally for pressurizing the process fluid held within.

Part 31 Optional embodiment features for this overall device embodiment, being means to allow one or more walls or sides of a containment vessel (part 30) to be relatively flexible, via diaphragm-like elements which sealingly communicate with the vessel (part 30).

Part 32 Supporting structure for the overall vessel (part 30), such as a mounting base.

Part 33 One or more inlets for ingress of process fluid into the containment vessel (part 30). Such outlets may penetrate vertical walls of such a vessel as oriented in FIG. 11, or they may penetrate top or bottom horizontal walls or sides of such a vessel.

Part 34 One or more outlets for egress of retentate fluid from the containment vessel. Such outlets may penetrate vertical walls of such a vessel as oriented in FIG. 11, or they may penetrate top or bottom horizontal walls or sides of such a vessel.

Part 35 One or more outlets for egress of permeate fluid from the interiors of all of the tensioned membrane envelopes anchored each of by the filter elements, communicating with parts 13 as shown in FIG. 7.

Figure 12:
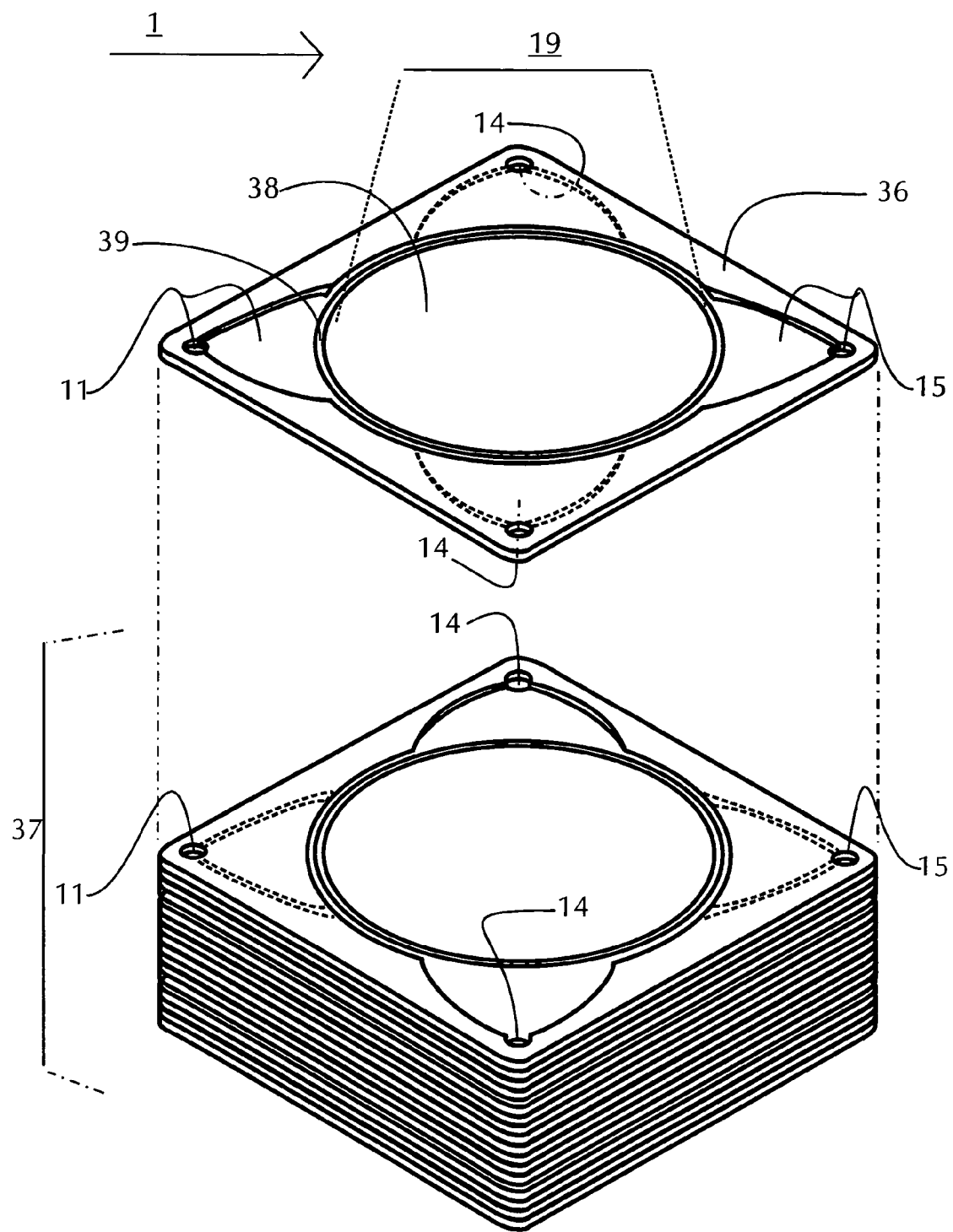
FIG. 12 is a schematic drawing showing an exploded isometric view of a filtration system having a plurality of stacked filter elements with each filter element having a single, tensioned membrane sheet formed in accordance with teachings of the present invention.

FIG. 12 shows a top perspective view of another embodiment of a filter element using the membrane tensioning method of construction of the present invention, whereby the peripheral anchoring, sealing and tensioning includes a relatively thin plate-like element, which may be herein described as a plate frame. This element may tension an enclosed membrane sheet in ways similar to the embodiments shown in FIG. 1, 4, 7 or 8 or via other practical fabricating techniques. The outer plate frame like element of this embodiment differs from the previously described embodiments herein, in that each such plate frame anchors and holds in tension only a single membrane sheet, rather than the twin sheet envelopes of the earlier embodiments. Additionally, each plate frame provides integral fluid flow paths, as shown in FIG. 12, for the ingress of process fluid and the egress of both accumulating retentate and permeate materials.

Every two of the plate frames in FIG. 12 represents a symmetrically mated pair, whose joined inner surfaces form fluid channels parallel to the membrane surfaces, and also segments of fluid channels or pipes relatively perpendicular to said surfaces. Gasketing applied between each of the mated pairs of plate frames, and between all sets of such pairs, form fluid seals to keep all such fluid channels discrete from one another, and also additional fluid seals such that the mated and sealed plurality of plate frames forms an integral containment vessel, including the open center work area of all the tensioned sheet membranes.

Part 1 Direction of a process fluid flowing across the overall filter element (part 2).

Part 11 One or more inlets into the overall filter element (part 36) for the ingress of the process fluid.

Part 14. One or more permeate outlets from the filter element (part 36).

Part 15. One or more outlets from the filter element (part 36) to permit the egress of the retentate materials accumulating on the outer surfaces of the tensioned membrane envelope (part 5).

Part 19 Central membrane surface work areas of each of the filter elements (parts 2), which central work areas are relatively and substantially open, not being restricted or obstructed by mechanical support or spacing members.

Part 36 Membrane anchoring and tensioning member formed as a relatively thin plate-like element, to support a single tensioned membrane sheet.

Part 37 Vertically stacked and sealingly joined plurality of individual membrane, plate-like outer membrane anchoring and tensioning elements (parts 36), including fluid flow paths provided both by each individual plate-like element (parts 36) and by their combination into part 37.

Part 38 An individual relatively flexible membrane sheet, anchored and tensioned within and by means of part 36.

Part 39 Supports for anchoring and tensioning membrane sheets (such as part 3B in this figure) at their peripheries to a membrane anchoring and tensioning member (such as part 36 in this figure), including anchoring and tensioning devices shown in FIG. 1, or 4, or 7 or 8 and as described in their accompanying text.

Figure 13:
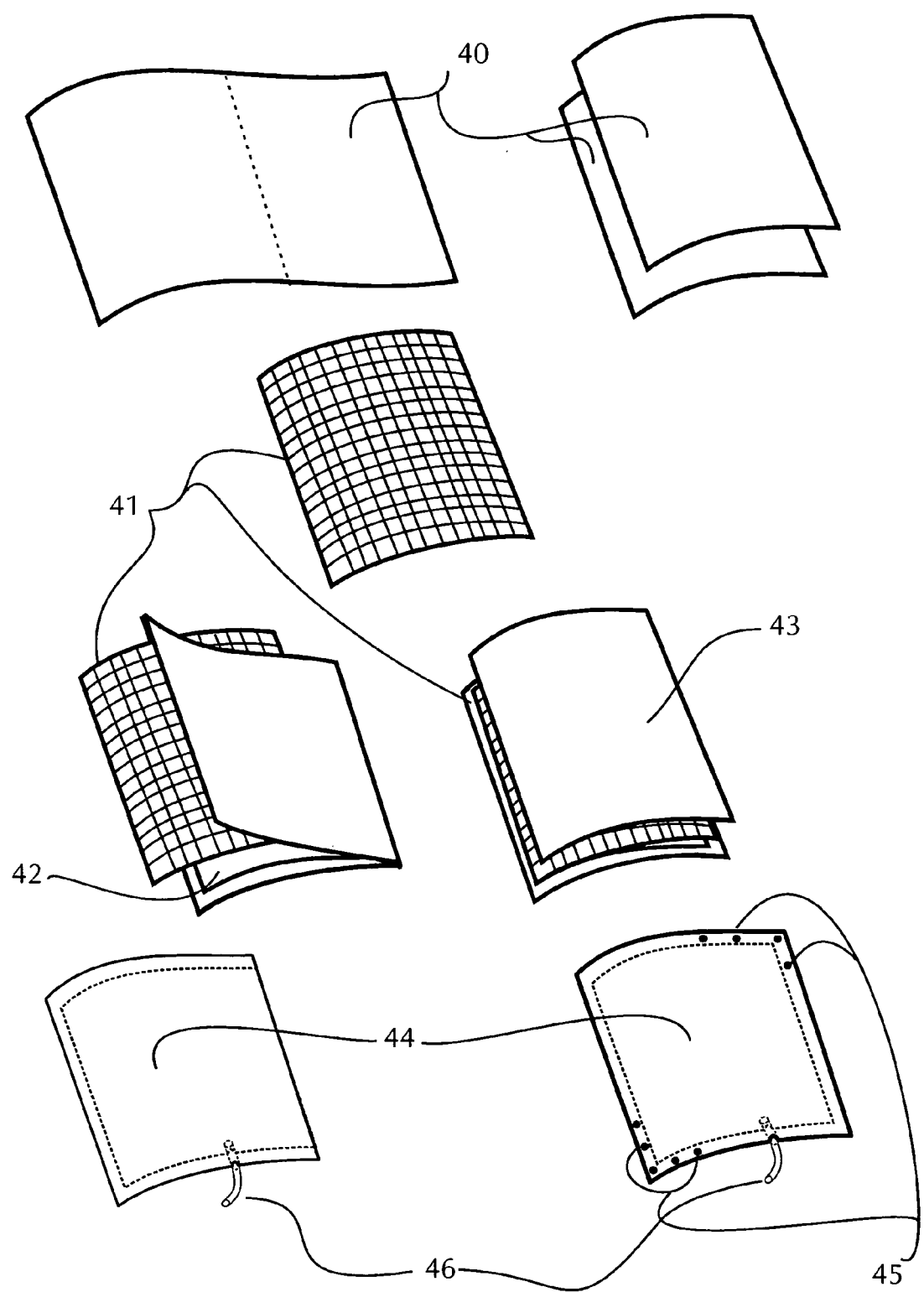
FIG. 13 is a schematic drawing showing various steps associated with one method of forming a membrane envelope in accordance with teachings of the present invention.

FIG. 13 shows a perspective view of embodiments of flexible sheet membranes, variously manipulated and sealingly joined to enclose a defined inner space or chamber, and resulting in a flexible membrane envelope, whose edges include or comprise connectors for tensioned anchoring of said envelope to a surrounding ring, frame, vessel of other support member.

Part 40 Flexible sheet or sheets of filter media material.

Part 41 Spacer or separator to adjacent interior surfaces of two membrane sheets from directly communicating with each other, such as netting or bleed cloth. The spacer or separator permits the unrestricted flow of liquid between any two membranes in a direction substantially parallel to the planes of the membrane sheets.

Part 42 A single part 40 folded onto itself with the three non-folded edges sealingly joined to form an enclosed flexible membrane envelope.

Part 43 Two of parts 40 with all of their edges sealingly joined to form an enclosed flexible membrane envelope, and incorporating and holding in place the membrane separating means (part 41).

Part 44 Flexible membrane envelope formed by various edge-joining and sealing means from parts 40.

Part 45 Fastening device around the periphery of part 44, for joining flexible membrane
    envelope to connectors communicating with external means for supporting and tensioning said envelope Part 46 Permeate exits for flexible envelope part 44, through a sealed penetration into the interior of said envelope, and whereby such flexible tubing communicates to the exterior of an overall filtration device; the location of part or parts 46 may be as shown in this embodiment, or at any location or locations on the periphery of part 44.

Figure 14:
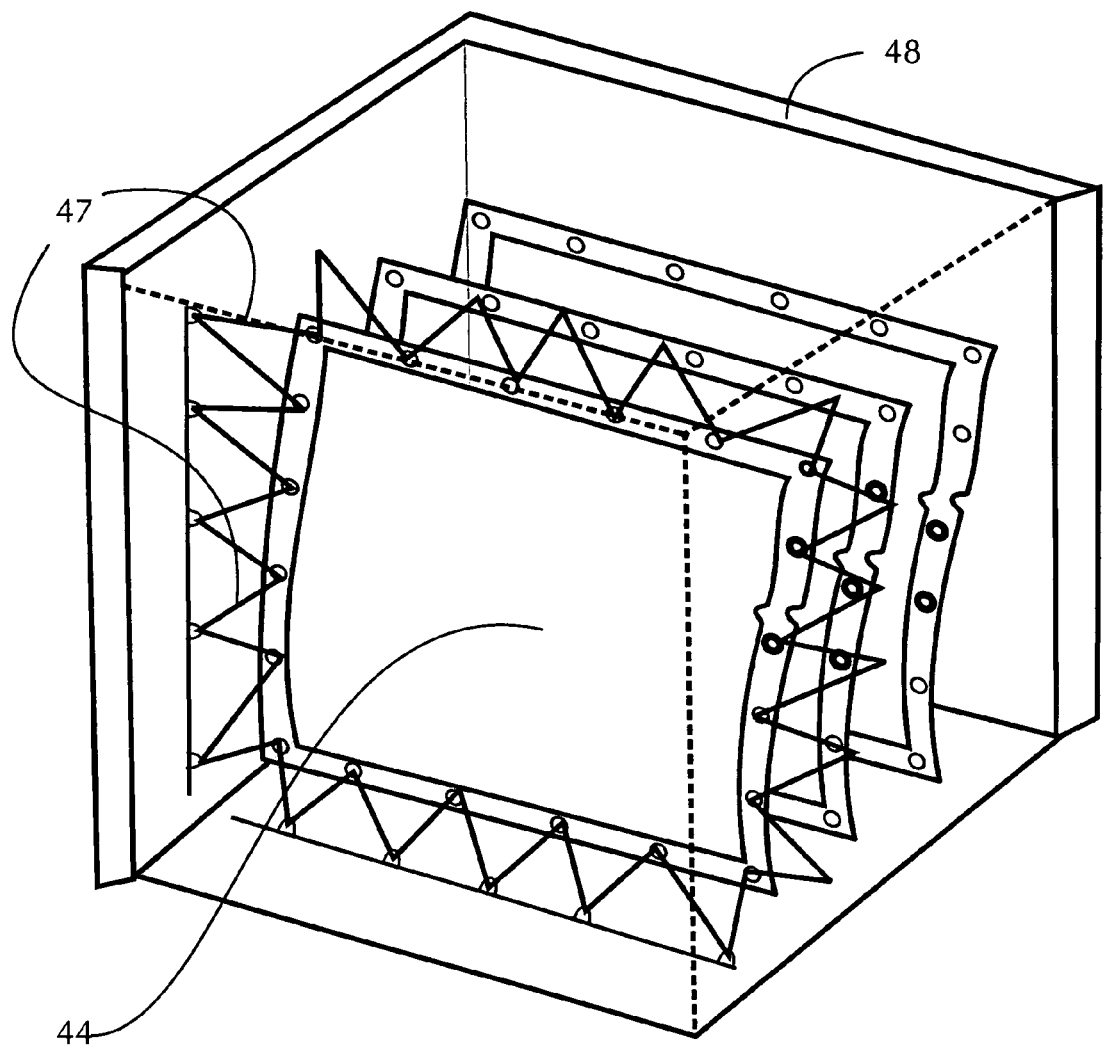
FIG. 14 is a schematic drawing showing an isometric view with portions broken away of a filtration system with a plurality of flexible membrane envelopes formed in accordance with teachings of the present invention.

FIG. 14 shows a perspective view of an embodiment whereby a flexible membrane envelope may be tensionally anchored and mounted directly to the walls of a containment vessel. This embodiment may additionally include intermediary mounting means, such as fixtures on or in said containment vessel walls.

Part 44 A flexible membrane envelope formed as in FIG. 13, Part 44.

Part 47 Fastening device from the periphery of part 44, to an external frame, rack or to walls of a containing vessel, tank or cartridge, such as that shown as part 48.

Part 48 A containment vessel, to additionally serve as a surrounding frame on which to anchor and tension one or a plurality of stacked, tensionally anchored and mounted filter elements by various standard fastening devices.

Figure 15:
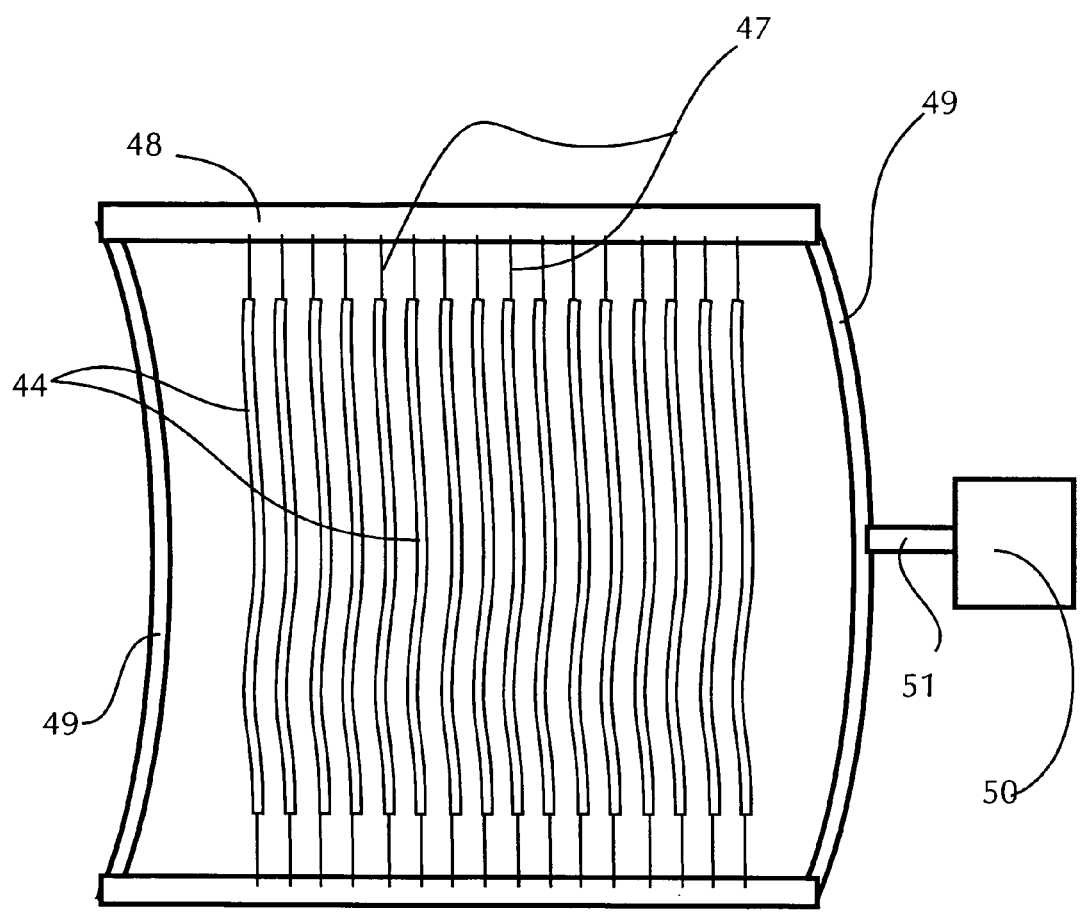
FIG. 15 is a schematic drawing in section with portions broken away showing a filtration system having a plurality of flexible membrane envelopes and an energy source operable to clean surfaces of the membrane envelopes in accordance with teachings of the present invention.

FIG. 15 shows a cut-away side view of a possible embodiment wherein multiple tensioned membrane elements are stacked in parallel within a vessel, wherein such tensioned membrane elements function analogously to filter elements. Note that flow paths for injecting process fluid into the vessel and for egress of accumulated permeate fluid and retentate are not depicted in this figure. Alternative, optional features in this embodiment are also shown in this figure, namely, relatively flexible but fluid impermeable elements at either end (in the figure, left and right walls of the vessel), permitting a diaphragm-like movement of vessel contents on an axis perpendicular to the planes of said elements, and also optionally, which is an energy source for imparting vibratory or acoustic energy through the vessel, through its fluid contents and through all of the membrane sheets generally perpendicular to their planes, due to the tensioned membrane envelopes unrestricted, open central spaces, which unobstructed work area is made possible by the tensioning method of construction of the present invention. For some applications vibratory or acoustic energy may be directed at an acute angle (less than 90° and greater than 10°) relative to the membrane sheets.

Part 44 Plurality of stacked tensioned membrane envelopes within an enclosing vessel.

Part 47 Flexible connector for anchoring and tensioning the peripheries of the tensioned filter envelopes (part 44).

Part 48 A vessel, tank, cartridge or other container enclosing a plurality of stacked, tensionally constructed filter envelopes (parts 44).

Part 49 Optional embodiment as part 48, comprising a fluid impermeable and relatively flexible, diaphragm-like element communicating sealingly with part 48 and parallel to the tensioned membrane planes of parts 44.

Part 50 Optional embodiment including an energy source for generating reciprocating mechanical or acoustical vibration, in a direction substantially perpendicular to the planes of the stacked tensioned membrane elements.

Part 51 Optional embodiment of a coupler for transmitting reciprocating mechanical or acoustical vibration produced by part 50, into and through the fluid and tensioned membrane surfaces, substantially perpendicular to the plane of those surfaces.

Figure 16:
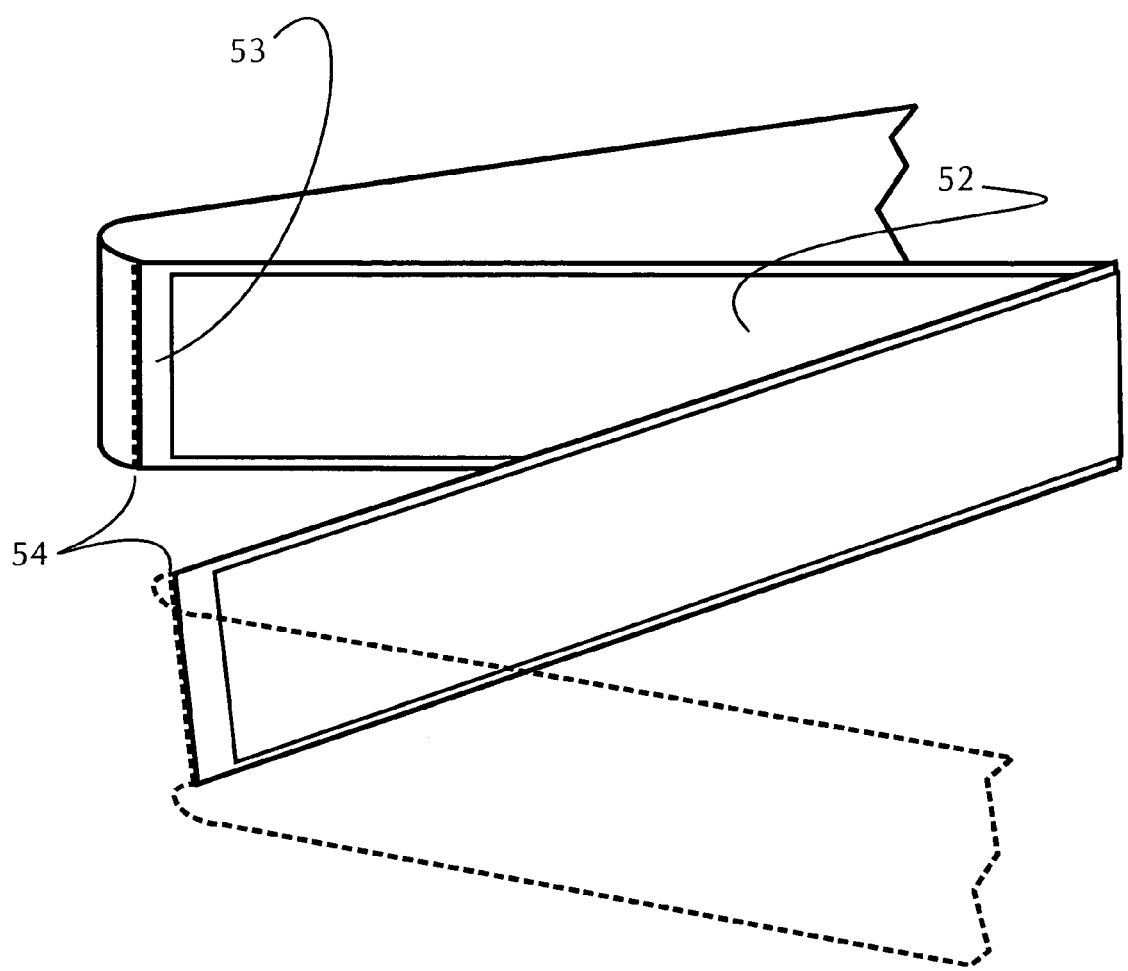
FIG. 16 is a schematic drawing showing an isometric view with portions broken away of a series of flexible membrane envelopes coupled with each other which may be used to form a roll incorporating teachings of the present invention.

FIG. 16 shows a perspective view of an embodiment of a flexible membrane envelope formed by sealed joining of a multi-layer sandwich of two flexible membrane sheets, such that said envelope is substantially longer than it is wide, and may be formed in a continuous or endless format, with internal sealing dividers placed at intervals along its length, and further, with optional perforations at such sealed divider points, to perform the function of breaking off segments of said envelope without disturbing the function of any segment continuing to act as a sealed envelope containing a separate, defined inner space.

Part 52 Embodiment of a flexible membrane envelope, formed in a continuous or substantially endless shape.

Part 53 Intermittently spaced, internally sealing dividers, optionally sealing off one longitudinal segment of the relatively continuous flexible membrane envelope from the next.

Part 54 Intermittently spaced disconnects for separation of one segment of a continuous flexible membrane from another, such as a perforation or other removable connector spaced within part 53, so that both segments retain their sealingly separate interior space or chamber after separation.

Figure 17:
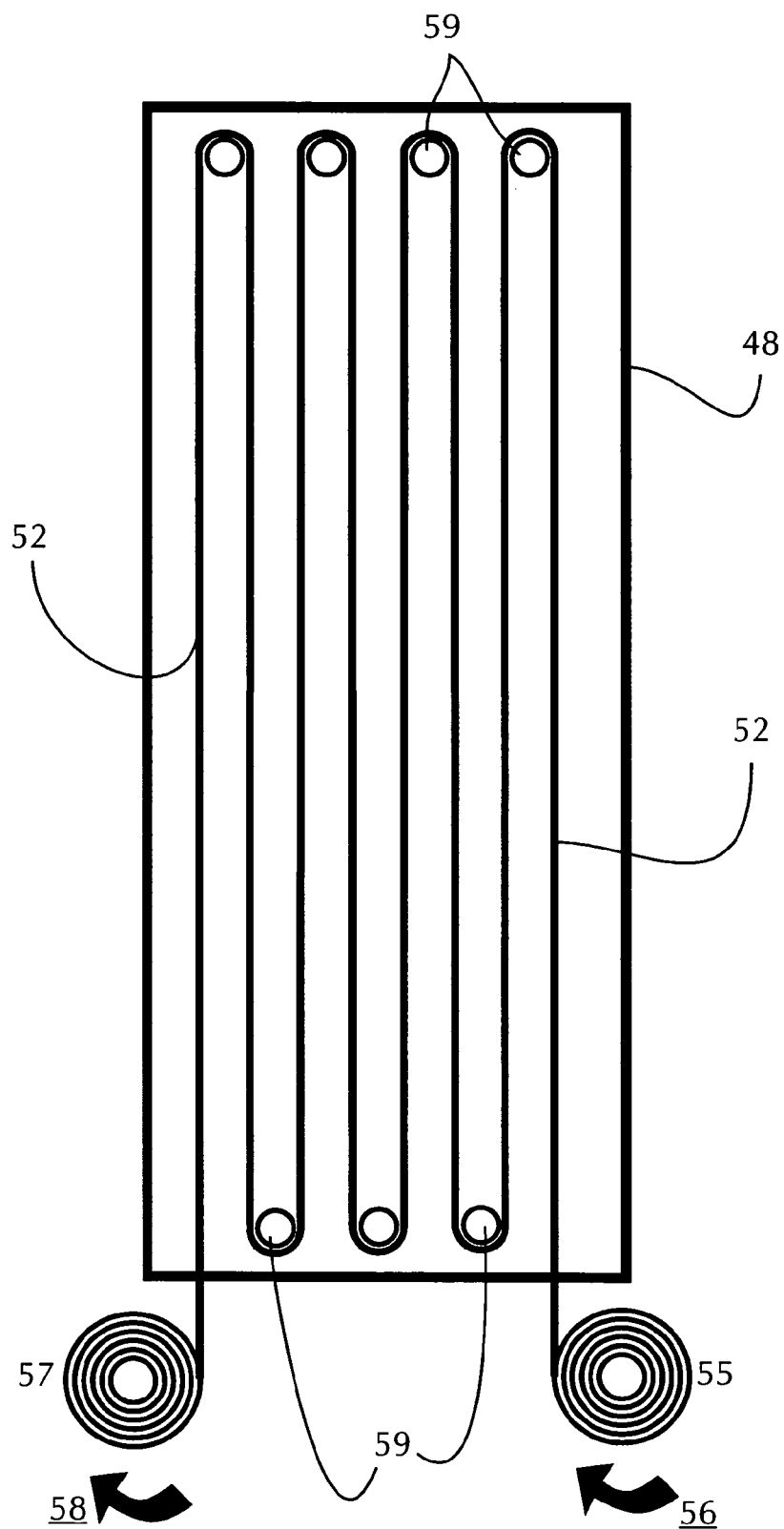
FIG. 17 is a schematic drawing in section with portions broken away showing a filtration system with a roll of filter media operable for movement therethrough in accordance with teachings of the present invention.

FIG. 17 shows a top view of an embodiment of membrane tensioning construction and mounting, wherein a continuous or substantially endless roll embodiment of a flexible membrane envelope may be anchored via mounting between a feed and a takeup roller mechanically communicating with a rigid support element such as a containment vessel or tank, and incorporating with intermediate rollers so located as to provide relative evenness of tensioning on all segments of the flexible membrane element.

Part 48 A containment vessel, to additionally serve as a surrounding frame on which to anchor and tension one or a plurality of stacked, tensionally anchored and mounted filter elements.

Part 52 Embodiment of a flexible membrane envelope, formed in a continuous or substantially endless shape.

Part 55 Feed roller on which an unused quantity of part 52 may be mounted, held and stored.

Part 56 Arrow indicating direction in which part 52 may be unrolled from roller part 55.

Part 57 Takeup roller on which a used quantity or used segments of part 52 may be captured, held and stored.

Part 58 Arrow indicating direction in which part 52 may be rolled up upon roller part 55.

Part 59 Intermediate tensioning rollers, for maintaining a relatively even tension on all continuous segments of a flexible membrane element part 52.

Figure 18:
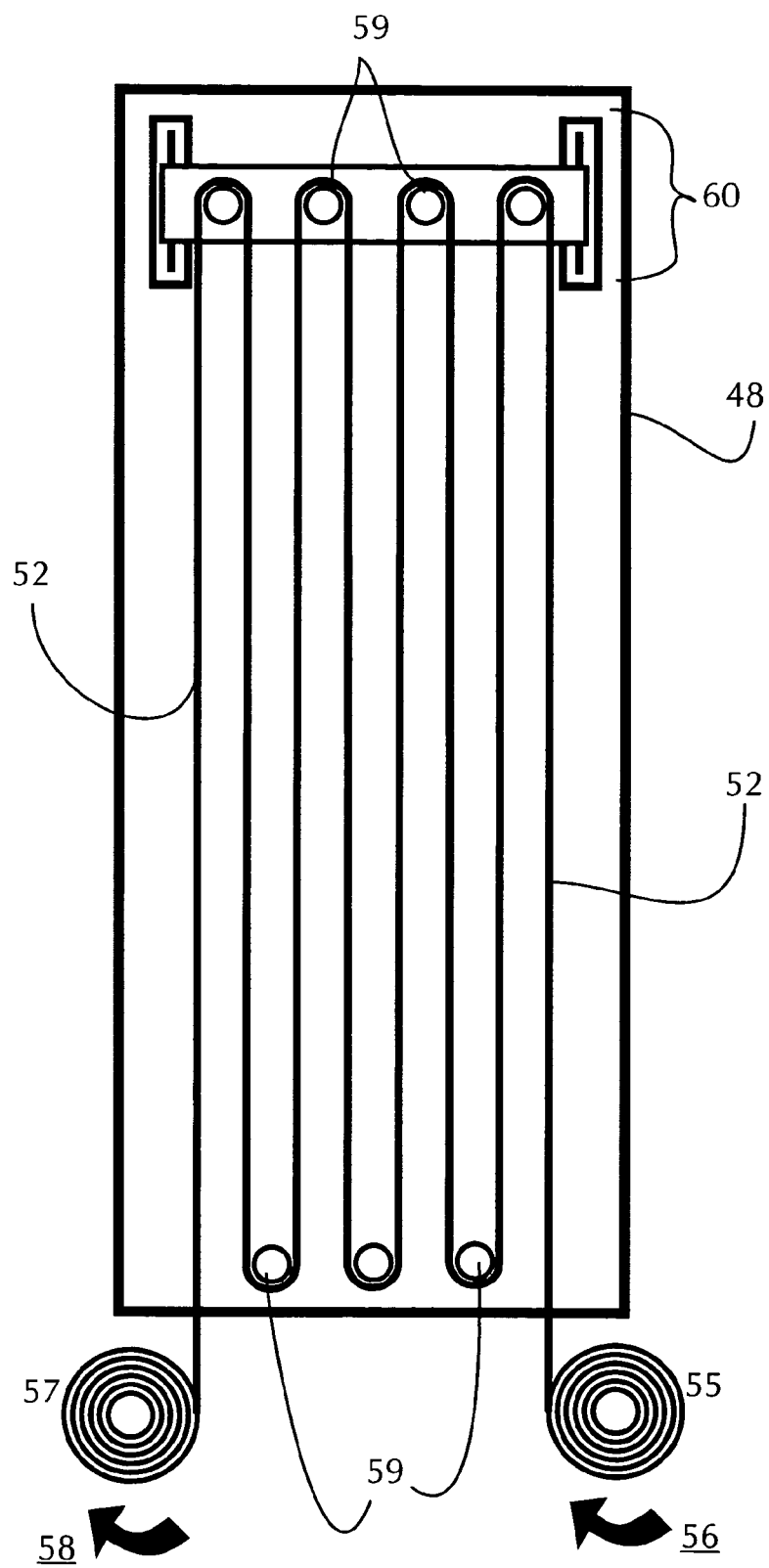
FIG. 18 is a schematic drawing in section with portions broken away showing the filtration system of FIG. 17 combined with a variable tensioning device engaged with the roll of filter media in accordance with teachings of the present invention.

FIG. 18 shows a top view of an alternative embodiment similar to that shown in FIG. 17, except for a variable tensioning device operable to vary the amount of tension by which a flexible membrane envelope may be held and suspended across a supporting structure such as a containment vessel or tank, such that the variation of such tensioning may be achieved at any time during filtration. Such variations in tension serve to stretch, vibrate or bounce membrane surfaces, thus destabilizing any buildup of caked solids resting thereon. Note that this cake-removal cleaning effect is not achievable using conventional membrane element construction methods, in which the membrane surfaces are held rigidly immobile.

Part 48 A containment vessel, to additionally serve as a surrounding frame on which to anchor and tension one or a plurality of stacked, tensionally anchored and mounted filter elements.

Part 52 Embodiment of a flexible membrane envelope, formed in a continuous or substantially endless shape.

Part 55 Feed roller on which an unused quantity of part 52 may be mounted, held and stored.

Part 56 Arrow indicating direction in which part 52 may be unrolled from roller part 55.

Part 57 Takeup roller on which a used quantity or used segments of part 52 may be captured, held and stored.

Part 58 Arrow indicating direction in which part 52 may be rolled up upon roller part 55.

Part 59 Intermediate tensioning rollers, for maintaining a relatively even tension on all continuous segments of a flexible membrane element part 52.

Part 60 Variable tensioning device operable to vary the amount of tensioning applied in a relatively uniform manner to all segments of a flexible membrane envelope part 52, either during or between filtration operations. Such function may be performed by a device such as shown in this figure or a sliding mechanism communicating with all of the intermediate tensioning rollers parts 59 on one side of a support frame or supporting tank walls, such that said sliding mechanism may move all such roller parts further away or closer to the opposite wall of said frame or tank, thus varying the tension on all segments of a tensioned flexible membrane envelope part 52.

Figure 19:
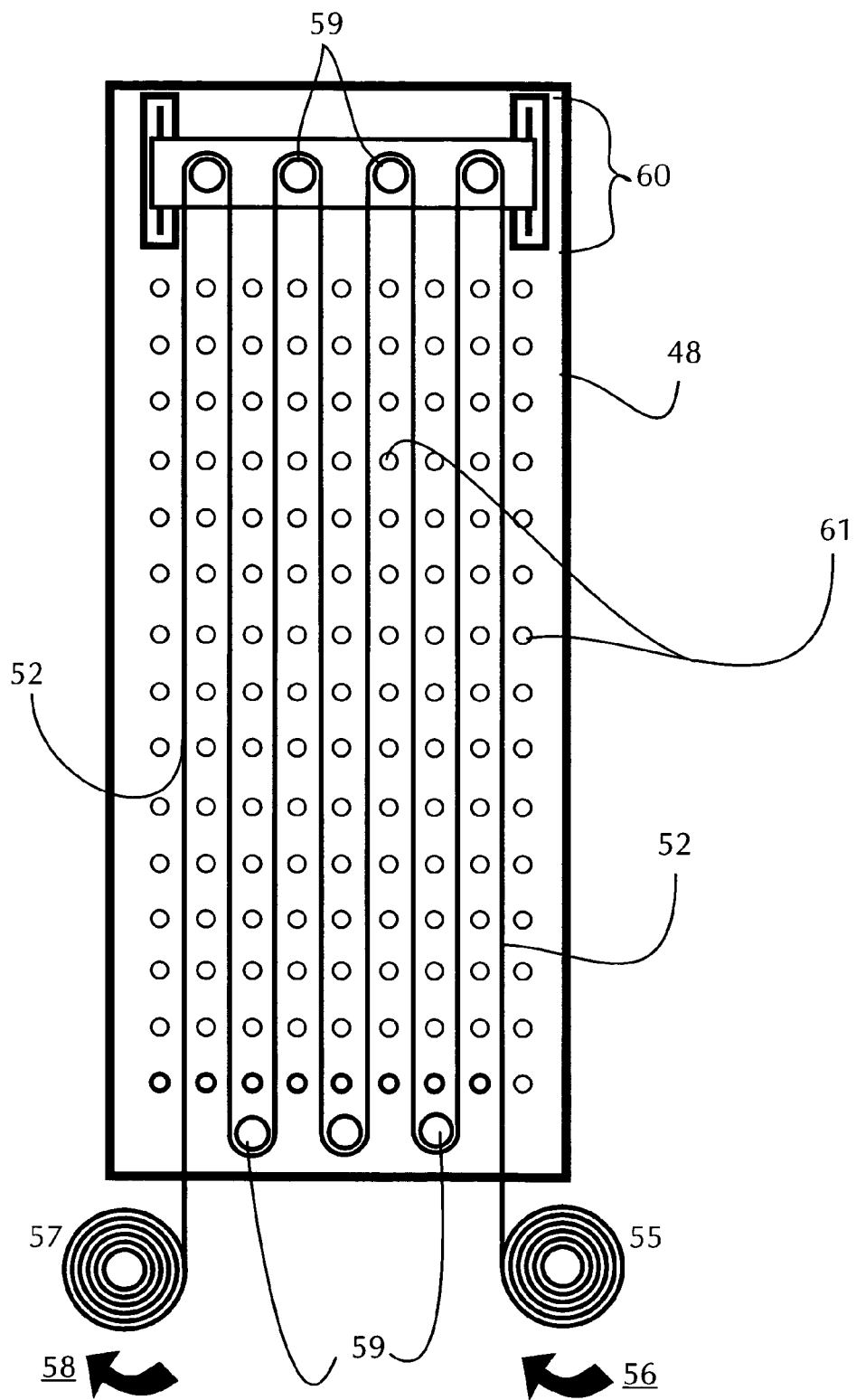
FIG. 19 is a schematic drawing in section with portions broken away showing the filtration system of FIG. 18 along with conduits for injecting air or other gases into the filtration system for use in cleaning the filter media in accordance with teachings of the present invention.

FIG. 19 shows a top view of an alternative embodiment similar to those shown in FIGS. 17 and 18, except with a tensioning device added to provide for varying the amount of tension by which a flexible membrane envelope may be held and suspended across a supporting structure such as a containment vessel or tank, such that variation of such tensioning may be achieved at any time during filtration, and also with additional apparatus added for the direction of air bubbles under pressure against all upstream membrane surfaces of the continuous membrane envelope. Variable tensioning during dynamic filtration will serve to undermine the support of any solids cake clinging to said surfaces, enhancing the ability of the air bubbles to remove such cake thereby loosened. Note that this combination of cleaning methods is for the loosening of cake by varying a membrane surface's degree of tension, is not achievable using conventional membrane element construction methods, in which the membrane surfaces are often held rigidly immobile.

Part 48 A containment vessel, to additionally serve as a surrounding frame on which to anchor and tension one or a plurality of stacked, tensionally anchored and mounted filter elements.

Part 52 Embodiment of a flexible membrane envelope, formed in a continuous or substantially endless shape.

Part 55 Feed roller on which an unused quantity of part 52 may be mounted, held and stored.

Part 56 Arrow indicating direction in which part 52 may be unrolled from roller part 55.

Part 57 Takeup roller on which a used quantity or used segments of part 52 may be captured, held and stored.

Part 58 Arrow indicating direction in which part 52 may be rolled up upon roller part 55.

Part 59 Intermediate tensioning rollers, for maintaining a relatively even tension on all continuous segments of a flexible membrane element part 52.

Part 60 Variable tensioning device operable to vary the amount of tensioning applied in a relatively uniform manner to all segments of a flexible membrane envelope part 52, either during or between filtration operations. Such function may be performed by a device such as shown in this figure or a sliding mechanism communicating with all of the intermediate tensioning rollers parts 59 on one side of a support frame or supporting tank walls, such that said sliding mechanism may move all such roller parts further away or closer to the opposite wall of said frame or tank, thus varying the tension on all segments of a tensioned flexible membrane envelope part 52.

Figure 20:
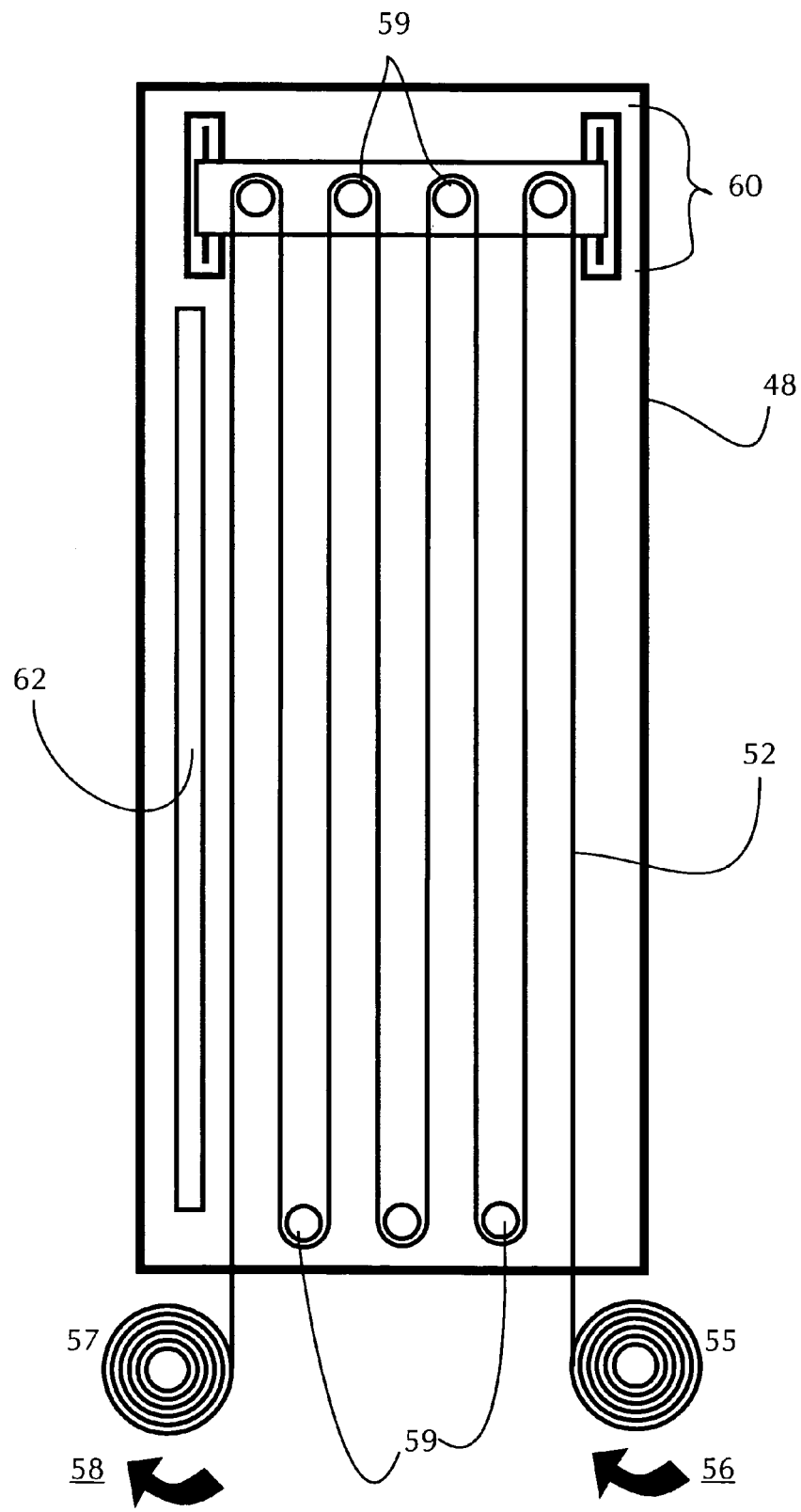
FIG. 20 is a schematic drawing in section with portions broken away showing the filtration system of FIG. 18 in combination with an energy source for directing mechanical or acoustical vibration energy for use in cleaning the associated filter media in accordance with teachings of the present invention.

Part 61 Air injection flow path, such as nozzles or conduits, located at or toward the bottom of the tank or vessel part 48, such that air bubbles may be forcibly ejected upwards and against all upstream membrane surfaces of the tensioned continuous membrane envelope segments, for cleaning purposes, either alone or in conjunction with variable tensioning of said envelope segments during dynamic filtering FIG. 20 shows a top view of an alternative embodiment similar to that shown in FIGS. 17, 18 and 19, except with an adjustable tensioner added to provide for varying the amount of tension by which a flexible membrane envelope may be held and suspended across a supporting means such as a containment vessel or tank, such that the variation of such tensioning may be achieved at any time during filtration, and also with a coupler added for directing mechanical or acoustical vibration perpendicular to and through the tensioned flat planes of all segments of the continuous membrane envelope within the supporting frame or tank. The variable tensioning during dynamic filtration will serve to undermine the physical support of any solids cake clinging to said surfaces, which effect will be enhanced and increased by the simultaneous passage of vibratory energy against and through all of the membrane surfaces.

Part 48 A containment vessel, to additionally serve as a surrounding frame on which to anchor and tension one or a plurality of stacked, tensionally anchored and mounted filter elements.

Part 52 Embodiment of a flexible membrane envelope, formed in a continuous or substantially endless shape.

Part 55 Feed roller on which an unused quantity of part 52 may be mounted, held and stored.

Part 56 Arrow indicating direction in which part 52 may be unrolled from roller part 55.

Part 57 Takeup roller on which a used quantity or used segments of part 52 may be captured, held and stored.

Part 58 Arrow indicating direction in which part 52 may be rolled up upon roller part 55.

Part 59 Intermediate tensioning rollers, for maintaining a relatively even tension on all continuous segments of a flexible membrane element part 52.

Part 60 Variable tensioning device operable to vary the amount of tensioning applied in a relatively uniform manner to all segments of a flexible membrane envelope part 52, either during or between filtration operations. Such function may be performed by a device such as shown in this figure or a sliding mechanism communicating with all of the intermediate tensioning rollers parts 59 on one side of a support frame or supporting tank walls, such that said sliding mechanism may move all such roller parts further away or closer to the opposite wall of said frame or tank, thus varying the tension on all segments of a tensioned flexible membrane envelope part 52.

Figure 21:
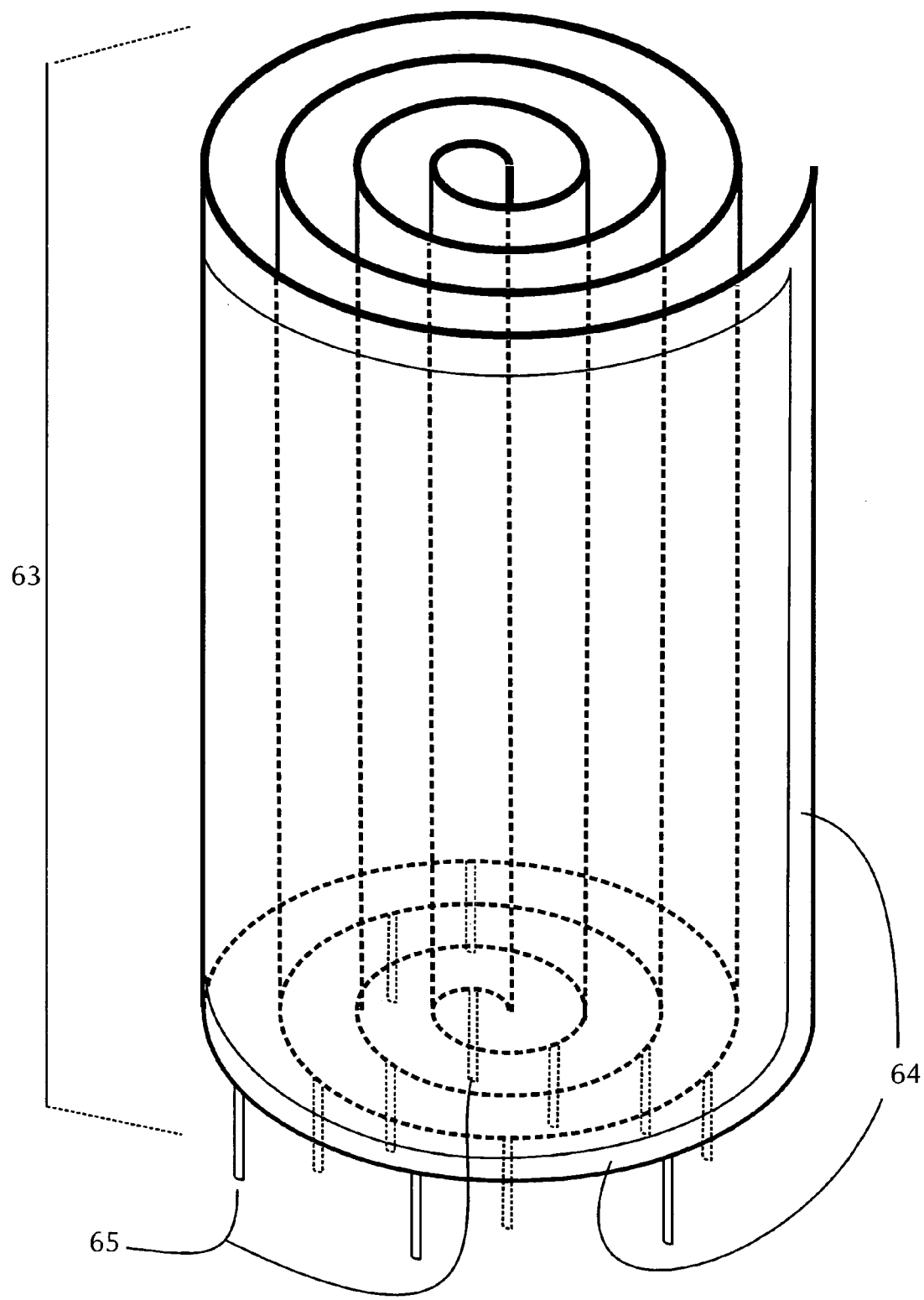
FIG. 21 is a schematic drawing showing an isometric view with portions broken away of a spiral wound flexible membrane envelope formed in accordance with teachings of the present invention.

Part 62 Energy source for generating and imparting acoustical or mechanical vibration often directed genes perpendicular to and through the parallel planes of flexible membrane envelopes mounted tensionally across a frame or enclosing vessel FIG. 21 shows a top perspective, partial cut-away view of an embodiment of a flexible membrane envelope formed similar to the relatively endless embodiment of a flexible membrane element shown in FIG. 16, such that said envelope is again formed by sealed joining of two flexible membrane sheets at its peripheral edges, and being relatively longer than it is wide, is spirally wound or rolled up along its length, for mounting within a relatively cylindrical vessel or container, such as a cartridge. Optionally one or more flow paths for permeate exit from the sealed interior of said spiral wound flexible membrane envelope may be provided at intermittent points sealingly penetrating the bottom edges of said envelope, as shown in FIG. 21.

Part 63 Embodiment of a flexible membrane envelope, formed in a shape relatively longer than its width, with two membrane sheets and one or more internal membrane separating elements such as bleed cloth or netting.

Part 64 Sealingly joined peripheral edges of part 63

Part 65 Permeate removal or draining flow path, such as flexible or rigid tubing sealingly penetrating into the interior of the flexible membrane element at intervals, and leading outside of the envelope.

Figure 22:
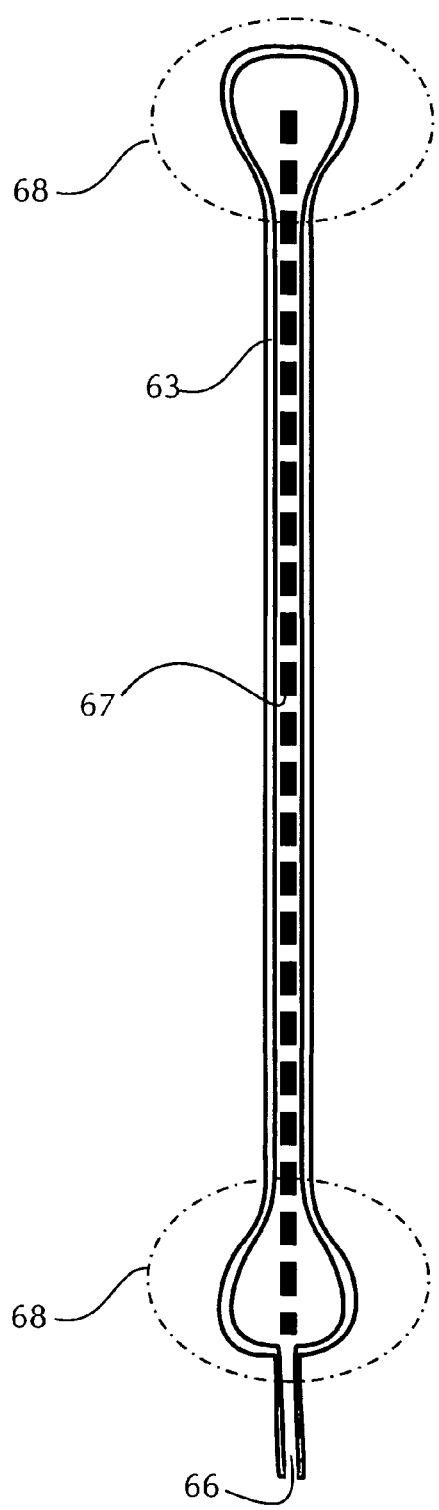
FIG. 22 is a schematic drawing in section with portions broken away of showing another example of flexible membrane envelope formed in accordance with teachings of the present invention.

FIG. 22 shows a cross section of a single segment, unwound, of flexible membrane envelope, part 63, showing relatively bulbous projection on the relative top and bottom of said envelope, as pictured in FIG. 21, as one mechanism for holding said envelop in a mounting apparatus and applying tension across the face of said membrane envelope.

Part 63 Cut-away side view of the fluid-permeable membrane envelope formed by sealingly joining the peripheral edges of two membrane sheets.

Part 66 Permeate removal or draining flow path, such as flexible or rigid tubing sealingly penetrating into the interior of the flexible membrane element at intervals, and leading outside of the envelope.

Part 67 Spacer operable to keep separate the two sheets of membrane forming the opposing planes of the flexible membrane envelope, part 63, such as bleed cloth or netting.

Parts 68 Relatively bulbous or similar shaped top and bottom edges of the flexible membrane envelope, part 63, as oriented in FIG. 21, as one of several mechanisms for mounting said membrane longitudinally and vertically under tension, the tension being applied by said bulbous edge protrusions being held in dovetail like slots in mounting means above and below said envelope, as oriented in this figure and in FIG. 23.

Figure 23:
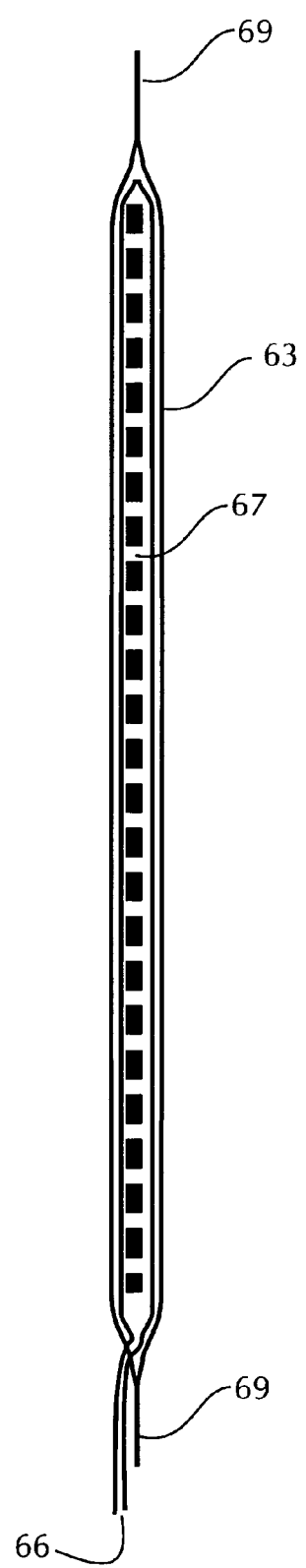
FIG. 23 is a schematic drawing in section with portions broken away showing still another example of a flexible membrane envelopes formed in accordance with teachings of the present invention.

FIG. 23 shows a cross section of a single segment, unwound, of flexible membrane envelope, part 63, showing another of several possible embodiments, a connecting filament projecting from the top edge and from the bottom edge of said envelope, as pictured in FIG. 21, as another mechanism for holding said envelop in a mounting means and thereby applying tension across the face of said membrane envelope.

Part 63 The fluid-permeable membrane envelope, formed by sealingly joining the peripheral edges of two membrane sheets.

Part 66 Permeate removal or draining flow path, such as flexible or rigid tubing sealingly penetrating into the interior of the flexible membrane element at intervals, and leading outside of the envelope.

Part 67 Spacer for keeping separate the two sheets of membrane forming the opposing planes of the flexible membrane envelope, part 63, such as bleed cloth or netting.

Parts 69 Alternative attachment for connecting, anchoring and tensioning relatively opposite sides of the flexible membrane envelope (part 63), intended to be spiral-wound within a vessel, such attachment comprising a filament sealingly and structurally joined to the sealed outer edges of the membrane envelope (part 63), with each such filament supported by coupling with a fastener within a first or top end cap or a second or bottom end cap of a relatively elongated containing vessel or cartridge.

Figure 24:
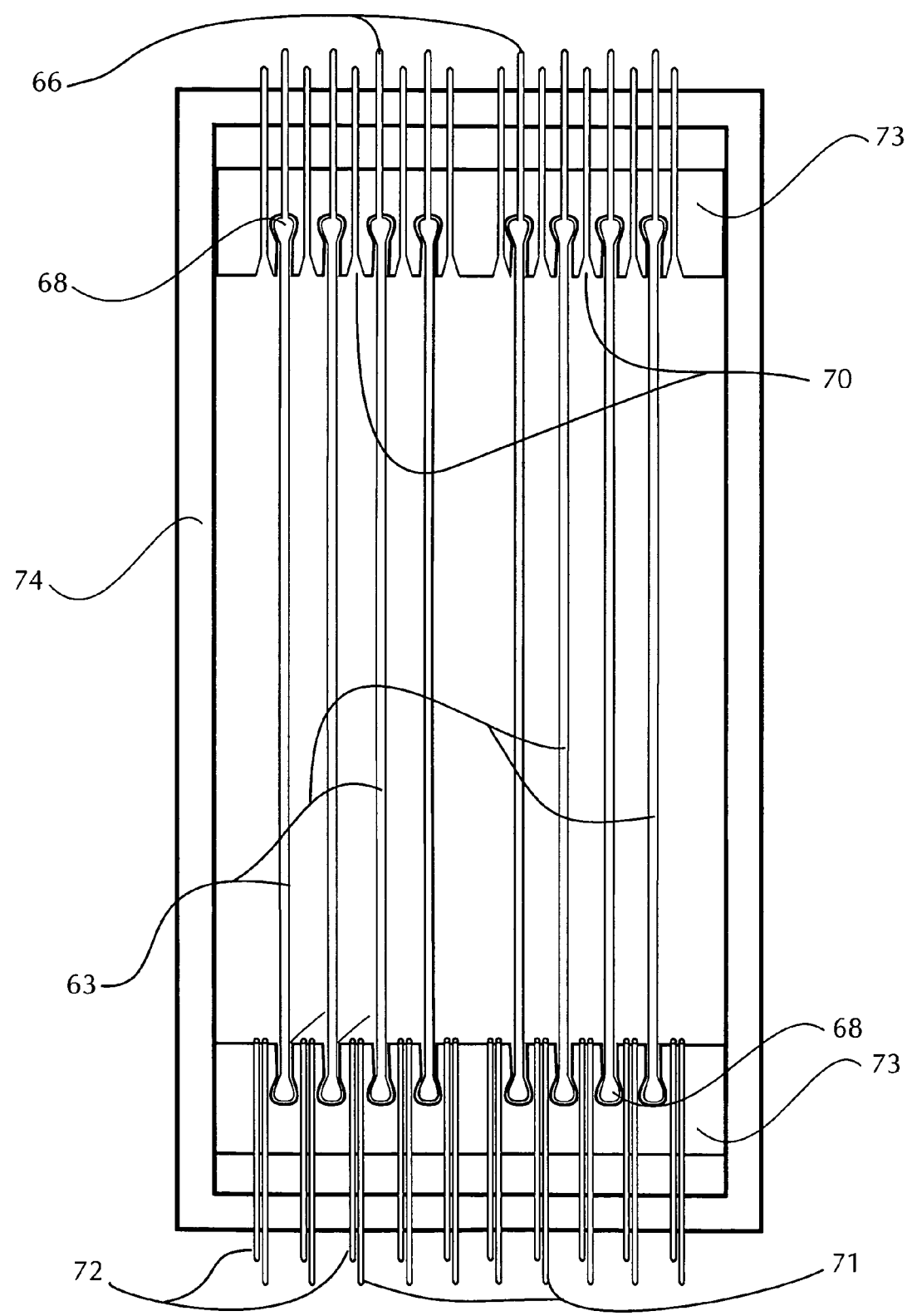
FIG. 24 is a schematic drawing in section with portions broken away of a filtration system having one or more spiral wound flexible membrane envelopes formed in accordance with teachings of the present invention.

FIG. 24 shows a cut-away side view, with perspective projections of inside top and bottom of spiral end cap holders, of the flexible membrane envelope (part 63) intended for spiral wound mounting, mounted in one embodiment of a filtration system, showing device incorporating teachings of the present invention, a bulbous projection, as shown in FIG. 22, for tensioning the flexible membrane envelope (part 63), fluid flow paths for ingress and egress of various constituents of the filtration process, and also conduits for injecting air bubbling parallel to all of the spiral-wound upstream membrane surfaces. Note that in this air-bubbling only embodiment of this construction example of tensioned, spiral wound membrane construction, the top and bottom end caps are mounted in a relatively fixed and rigid manner to the outer vessel.

Part 63 Embodiment of a flexible membrane envelope, formed in a shape relatively longer than its width, with two membrane sheets and one or more internal membrane separating elements such as bleed cloth or netting.

Part 66 Permeate removal or draining flow path, such as flexible or rigid tubing sealingly penetrating into the interior of the flexible membrane element at intervals, and leading outside of the envelope.

Parts 68 Relatively bulbous or similar shaped top and bottom edges of the flexible membrane envelope, part 63, as oriented in FIG. 21, as one of several mechanisms for mounting said membrane longitudinally and vertically under tension, the tension being applied by said bulbous edge protrusions being held in dovetail like slots in mounting means above and below said envelope, as oriented in this figure and in FIG. 21.

Part 70 Multiple outlets for egress of relatively de-liquefied retentate materials.

Part 71 Multiple inlets for ingress of process fluid.

Part 72 Multiple inlets for ingress of gaseous bubbles, to be directed under pressure through said inlets and down.

Part 73 Top and bottom end caps, comprising dovetail-like anchoring spiral grooves to hold and tension the expanded, bulbous edges (parts 69) of the flexible membrane envelope (part 63), which end caps are also, sealingly penetrated by process fluid inlets (parts 71), by retentate and permeate outlets (parts 70 and 66, respectively), and by air bubble inlets (parts 71).

Part 74 Outer walls of vessel or fluid-containing cartridge for this embodiment, relatively rigidly mounted to end caps (parts 73).

Figure 25:
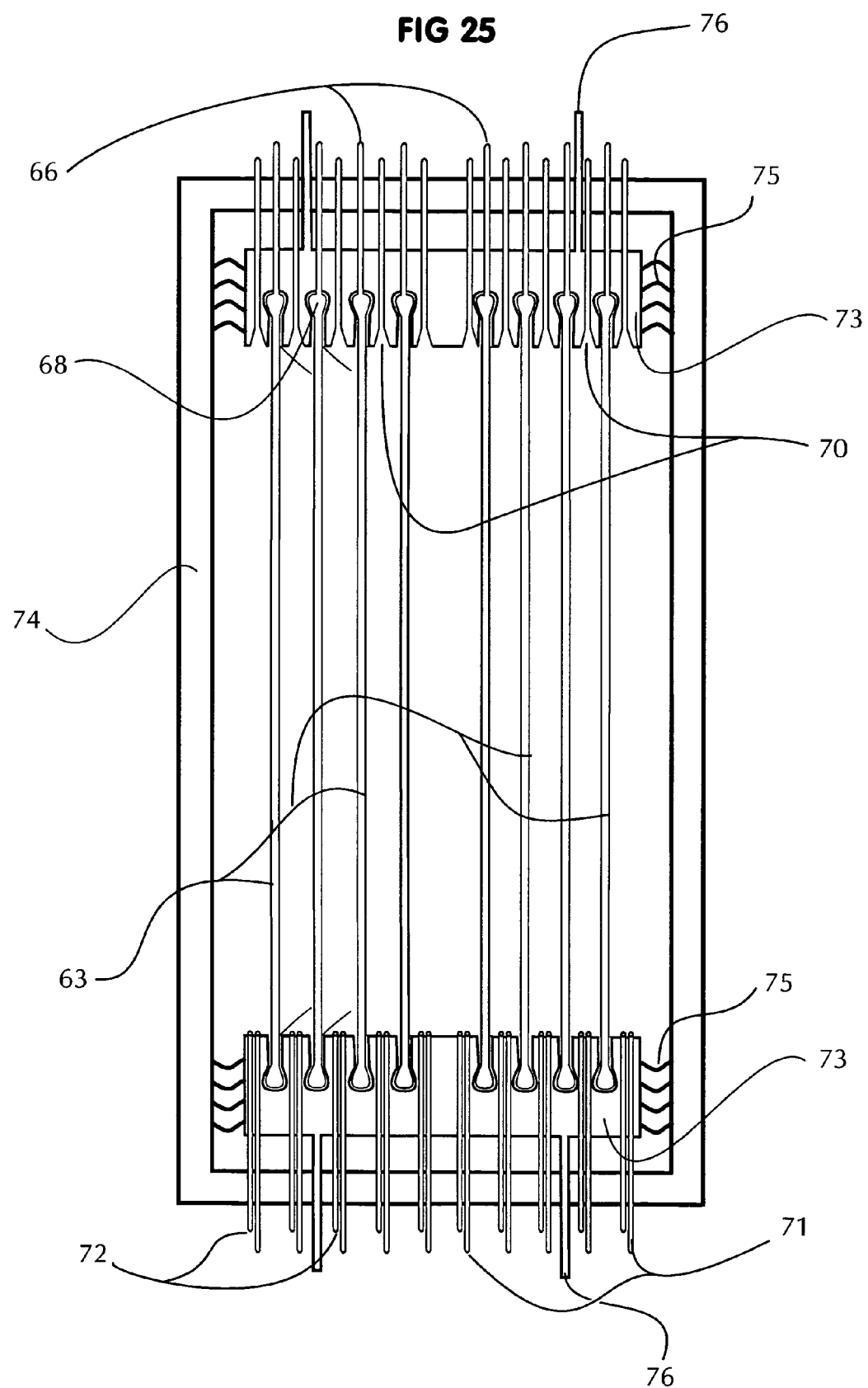
FIG. 25 is a schematic drawing in section with portions broken away showing a filtration system having one or more spiral wound flexible membrane envelopes attached to a first end cap and a second end cap slidably disposed within the filtration system.

FIG. 25 shows a cut-away side view, with perspective projections of inside top and bottom of spiral end cap holders, of the flexible membrane envelope (part 63) intended for spiral wound mounting, mounted in one embodiment of a filtration system, incorporating teachings of the present invention, including an alternative technique for tensioning the flexible membrane envelope (part 63), flow paths for ingress and egress of various constituents of the filtration process, and also flow paths for injecting air bubbling parallel to all of the spiral-wound upstream membrane surfaces. Note that in this second embodiment of this construction example of tensioned, spiral wound membrane construction, the top and bottom end caps communicate relatively flexibly with the surrounding outer vessel, so as to permit said end caps to be moved reciprocatingly, up and down as shown in the figure, to vary the tensioning on the flexible membrane elements, including during dynamic filtration. This ability to dynamically stretch and relatively relax the membranes is made possible by the method of constructing filter elements using the tensioning of membranes.

Part 63 Embodiment of a flexible membrane envelope, formed in a shape relatively longer than its width, with two membrane sheets and one or more internal membrane separating elements such as bleed cloth or netting.

Part 66 Permeate removal or draining flow path, such as flexible or rigid tubing sealingly penetrating into the interior of the flexible membrane element at intervals, and leading outside of the envelope.

Parts 68 Relatively bulbous or similar shaped top and bottom edges of the flexible membrane envelope, part 63, as oriented in FIG. 21, as one of several mechanisms for mounting said membrane longitudinally and vertically under tension, the tension being applied by said bulbous edge protrusions being held in dovetail like slots in mounting means above and below said envelope, as oriented in this figure and in FIG. 21.

Part 70 Multiple outlets for egress of relatively de-liquefied retentate materials Part 71 Multiple inlets for ingress of process fluid Part 72 Multiple inlets for ingress of gaseous bubbles, to be directed under pressure through said inlets and down Part 73 Top and bottom end caps, comprising dovetail-like anchoring spiral grooves to hold and tension the expanded, bulbous edges (parts 69) of the flexible membrane envelope (part 63), and are also sealingly penetrated by process fluid inlets (parts 71), by retentate and permeate outlets (parts 70 and 66, respectively), and by air bubble inlets (parts 71).

Part 74 Outer walls of vessel or fluid-containing cartridge for this embodiment, relatively rigidly mounted to end caps (parts 73).

Part 75 Flexible mounting and sealing elements between end caps (parts 73) and outer fluid-containing vessel or cartridge (part 74).

Part 76 Connecting members communicating between reciprocally movable end caps (parts 73) and an exterior energy source (not expressly shown) imparting linear motion to said end caps, such as but not limited to linear motors.

Figure 26:
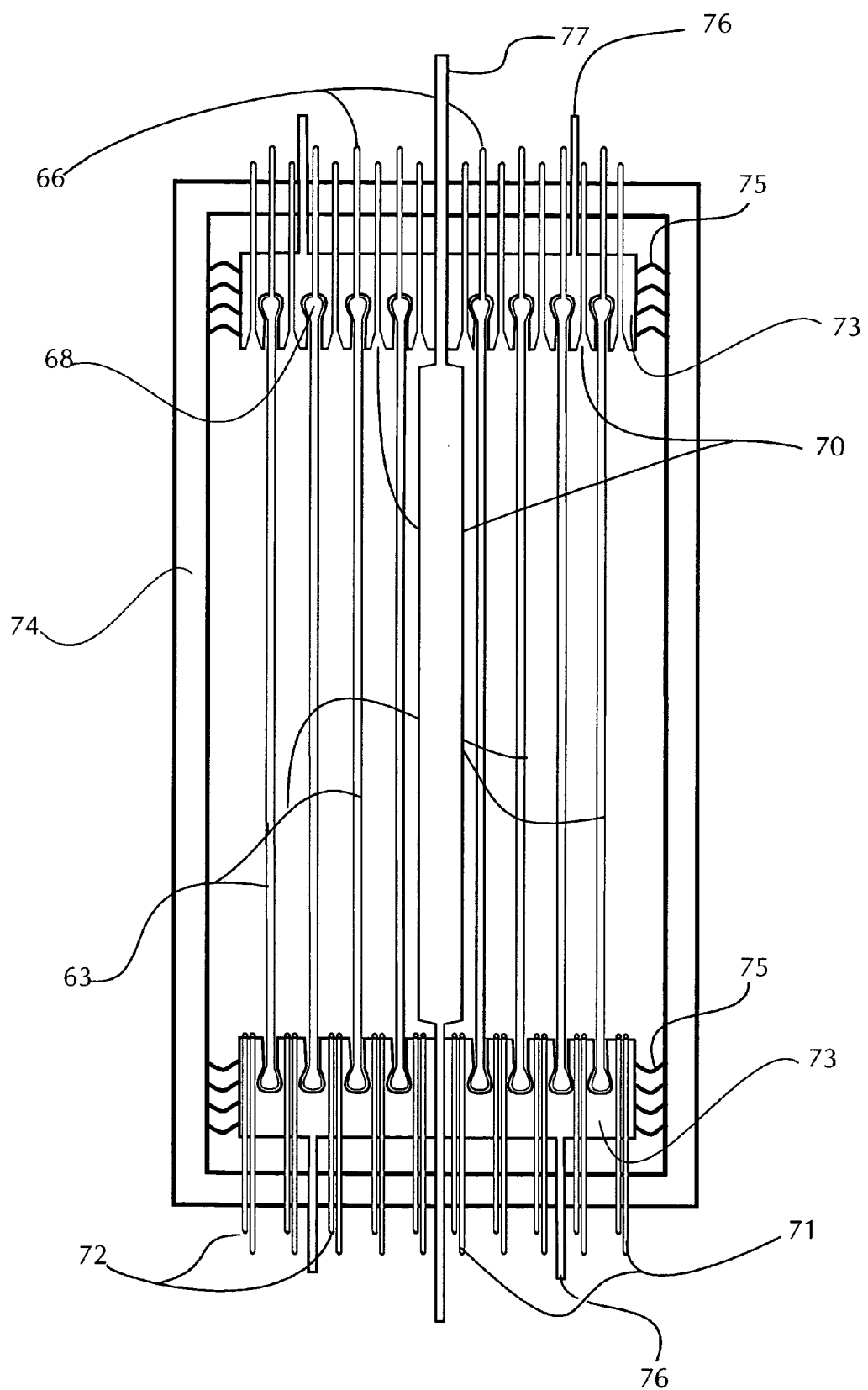
FIG. 26 is a schematic drawing in section with portions broken away showing the filtration system of FIG. 25 in combination with an energy source operable to direct vibration energy through associated spiral wound membrane envelopes.

FIG. 26 shows a cut-away side view, with perspective projections of inside top and bottom of spiral end cap holders, of the flexible membrane envelope (part 63) intended for spiral wound mounting, mounted in one embodiment of a filtration system, including incorporating teachings of the present invention, a third alternative technique for tensioning the flexible membrane envelope (part 63), flow path for ingress and egress of various constituents of the filtration process, and also flow paths for injecting air bubbling parallel to all of the spiral-wound upstream membrane surfaces.

Note that in this embodiment, the top and bottom end caps are communicate relatively flexibly with the surrounding outer vessel, so as to permit said end caps to be moved reciprocatingly, up and down as shown in the figure, to vary the tensioning on the flexible membrane elements, including during dynamic filtration. Note further that this embodiment includes an additional membrane cleaning device, a central torsionally oscillating or otherwise vibratory element, capable of directing vibratory energy radially outwards from the central axis of the overall device, against and through every spirally-wound membrane sheet, a cleaning effect achievable with tensioned membranes and the unobstructed central work area obtained by this tensioning method of construction.

Part 63 Embodiment of a flexible membrane envelope, formed in a shape relatively longer than its width, with two membrane sheets and one or more internal membrane separating elements such as bleed cloth or netting.

Part 66 Permeate removal or draining flow path, such as flexible or rigid tubing sealingly penetrating into the interior of the flexible membrane element at intervals, and leading outside of the envelope.

Parts 68 Relatively bulbous or similar shaped top and bottom edges of the flexible membrane envelope, part 63, as oriented in FIG. 21, as one of several mechanisms for mounting said membrane longitudinally and vertically under tension, the tension being applied by said bulbous edge protrusions being held in dovetail like slots in mounting means above and below said envelope, as oriented in this figure and in FIG. 21.

Part 70 Multiple outlets for egress of relatively de-liquefied retentate materials Part 71 Multiple inlets for ingress of process fluid Part 72 Multiple inlets for ingress of gaseous bubbles, to be directed under pressure through said inlets and down Part 73 Top and bottom end caps, comprising dovetail-like anchoring spiral grooves to hold and tension the expanded, bulbous edges (parts 69) of the flexible membrane envelope (part 63), and also multiply, sealingly penetrated by process fluid inlets (parts 71), by retentate and permeate outlets (parts 70 and 66, respectively), and by air bubble inlets (parts 71).

Part 74 Outer walls of vessel or fluid-containing cartridge for this embodiment, relatively rigidly mounted to end caps (parts 73).

Part 75 Flexible mounting and sealing elements between end caps (parts 73) and outer fluid-containing vessel or cartridge (part 74).

Part 76 Connector extending between reciprocally movable end caps (parts 73) and exterior apparatus operable to impart linear motion to said end caps, such as but not limited to linear motors.

Part 77 A central torsionally oscillating, rod-like inducer of vibration, radially outward against and through all of the spirally wound membranes.

The present invention includes, but is not limited to, a filter element formed by suspending and mounting flat membrane sheets constructed of any suitable filtering material having sufficient tensional strength, anchored along its entire edge or at only some of its edges, by an anchoring and tensioning element. The strength of such membrane material may be augmented by structural reinforcement such as netting, bleed cloth, or similar elements, which exhibit two structural qualities in addition to tensile strength. These additional qualities include elasticity and memory. Memory may be defined as the ability to recover an original shape and dimension after being stretched. Said structural reinforcing members may be co-anchored parallel to and with the membrane media at two or more relatively opposed points along the periphery of the media.

Anchoring and impermeable-sealing outer edges of the membrane sheet, and optionally for any tensional strength-reinforcing elements mounted parallel to said sheet, at the edges or the circumference of said membrane sheet, such that any two membrane sheets thus tensionally anchored and sealed, combine to form an enclosed inner space, maintained such that no two membranes in parallel touching each other by the tensioning device incorporating teachings of the present invention, and a defined outer space, thereby defining a sealed membrane envelope. Such an envelope may include a single, monolithic element of various discrete elements sealingly joined, or, the functional equivalent of such an envelope may be achieved by such means as sealing two discrete membrane sheets together at their peripheries, or alternatively, by clamping two discrete membrane sheets together at their peripheries, thus forming the required sealingly separate inner space within such sealed, clamped or otherwise edge-joined membrane sheets.

Flow paths are provided for the ingress of a process fluid into a filtration device, such that said process fluid communicates with the upstream membrane surfaces of the membrane envelope elements.

Flow paths are provided for the egress of permeate fluid, and, this being the fluid which has permeated through the membranes into the sealed inner spaces of the membrane envelope elements, from such inner spaces and out from the filtration device.

Flow paths are provided for the egress of retentate, example shown as part, this being the relatively thickened or condensed solid or colloidal materials unable to permeate the membranes, and thus collecting on the upstream faces of the membrane element elements, to the exterior of the filtration device.

Flow paths may be provided in accordance with teachings of the present invention to apply a desired pressure differential between the upstream and the downstream sides of filter media thus formed using tensioned construction, so as to impel or draw permeate travel or flux through the membrane sheets.

1. Tensioned Membrane Construction Functioning as a Filter Element.

This first of several possible embodiments of the tensioning method of construction comprises a vessel capable of holding a process fluid. Such a vessel may be a pressure vessel and may be formed into a cylindrical, cubical or a spherical body. Within said vessel may be one or a plurality of filter elements comprised as follows. A fluid permeable membrane having exterior and interiors surfaces is anchored and sealed to relatively rigid support frame at two or more of its relatively opposed edges, with said anchoring of sufficient strength to place and maintain tension on the membrane itself, suspended by any two edges or alternatively, by its entire periphery.

Two such membranes, sealingly anchored together in such a way that substantial space is defined and maintained between their inner surfaces at all points, FIG. 1, 3, in conjunction with their outer support and sealing means, such as a frame, ring or a peripheral member, FIG. 1, 6, 7, all together form a filter element, FIG. 1, 2, whose interior membrane surfaces communicate with a sealingly discrete interior space and which surfaces are separated at all points from one other, FIG. 1, 7. The assembly of such membranes when combined as a filter element also define a separate exterior space with which the exterior membrane surfaces communicate.

Various types of spaces provide separation between the interior surfaces of the two membranes. The use of separating and spacing devices, such as one or more sheets of cross bleed cloth or netting, placed between the membranes, parallel to said membranes, FIG. 1, 4. In the case of the present invention and of this embodiment of that invention, said bleed cloth or netting serves a second function in addition to providing for membrane spacing.

This second function is to reinforce certain structural qualities of the membrane sheets or the overall sandwich-like assembly of said sheets and the separating member or members, all in support of the tensioning method of filter element construction claimed herein. These reinforcing structural qualities are twofold. First, the bleed cloth, netting or other membrane separating member needs to be made of a material or of materials which offer a certain degree of elasticity, allowing said member and its related membranes to bounce and/or stretch within their outer anchoring members. Second, said material of construction needs to supply the structural quality of shape-holding, also known as memory. Thus, although such a separating means member, and its associated membrane sheets, may be stretched across their plane, or bounced similar to the motion of an elastic trampoline surface, the separating means member and its membrane sheets as an assembly, all sealingly tensioned by the outer supporting, anchoring and tensioning member, must on their own return to their or its original shape, after being so stretched and/or bounced by an external force. Certain commercially available netting and bleed cloth materials offer these qualities.

Said filter element additionally includes one or more outlets for conduction of the selected components of the process fluid permeating the membranes (permeates), FIG. 1, 14. As noted previously, the membranes may include additional supporting and tensioning reinforcement members, such as netting material, co-anchored and tensioned with the membranes 3 by the outer anchoring and support element FIG. 1, 6, 9. A plurality of the resulting filter elements, when combined within a containing vessel, may also communicate all of their upstream membrane surfaces with one or more inlet means for the ingress of process fluid, and with one or more outlet means from said vessel for the egress of accumulating relatively solid materials, these being those materials unable to permeate the membranes, FIGS. 2 and 3, FIGS. 5 and 6 and FIGS. 9 and 10.

This tensioning method of filter element construction enables multiple new means of applying vibration to the filter element thus formed, including vibration applied perpendicular to and through the membranes all across their open and unrestricted center work areas, vibration applied parallel to membranes to the elements themselves, air bubbling applied parallel or tangential to the planes of the membranes along their upstream surfaces, and combinations of all of these vibratory cleaning means. In many of these individual and combined means, a plurality of such elements may be enclosed within a pressure vessel with all vibrated in such manner or manners, FIG. 11.

The first of many possible embodiments for achieving the actual tensioning of a sheet of membrane to an outer anchoring and tensioning element, applicable to either this filter element embodiment, or to the following plate frame filter embodiment, are presented in FIGS. 4 and 5. In FIG. 4, for example, a membrane sheet 3 is permanently joined by welding, gluing or other adhering means at point 7, to an inner peripheral element 6, which element is shaped and formed to mate within an outer peripheral element 9. Remembering that membrane sheets 3 and inner peripheral element 6 are thereby so bonded as to function as a single part, this new assembly achieves tensioning of the membrane sheet in this particular embodiment, as follows.

The periphery of the inner peripheral element, FIG. 4, 6 is so formed of relatively compressible materials and includes a rib, bulb or bead, radially around its entire periphery 8. This part is designed to frictionally mate with a groove-like indentation 10 which is formed into and as an integral part of the outer peripheral element 9. When relatively downward pressure is applied (as viewed in FIG. 4) on inner peripheral element 6, its bulb or rib compressively contracts under downwards pressure and then pops or expands into the groove 10 in the outer peripheral element 9, and its decompression of shape causes an even and tightening or tensioning of the membrane surface 3.

A second embodiment for achieving the tensioning construction of a membrane by its connection to a relatively peripheral outer supporting element is shown in FIG. 7. As in the previous tensioning embodiment, a membrane sheet 3 is permanently joined by welding, gluing or other adhering means at point 7, to an inner peripheral element 6, which element is shaped and formed to mate within an outer peripheral element 9. However in this embodiment, a sloping surface 29 formed into the downwards facing portion of inner peripheral element 6, mates with a parallel sloping surface 29 on the upwards facing portion of outer peripheral element 9. When relatively downward pressure (as viewed in FIG. 7) on inner peripheral element 6, its sloped surface 29, contacting the parallel sloped surface 28 on outer peripheral element 9 causes even outward pressure at all points of the inner ring 6 and on its permanently adhered membrane sheets, and spacing elements 3, such that said sheets and their related parallel parts become evenly tensioned across the entire outer supporting ring, 9 and 6. The more such downward pressure is applied during construction on inner ring 6, the tighter the resulting tensioning of the membrane sheet 3. When the desired tensioning for a given filter element is thereby achieved, numerous means of fixing the contact points of the two sloped parts 27 and 28 including welding, adhesion, ultrasonic joining, may be employed to make said contact points a permanent joint.

2. Tensioned Membrane Construction Functioning as a Plate Frame Filter Element.

In this embodiment, a single sheet membrane having exterior and interiors surfaces is anchored and sealed at its edges to relatively rigid support frame at two or more of said edges or around its entire periphery as shown in FIG. 12, with said anchoring of sufficient strength to place and maintain tension on the membrane itself, suspended by any two edges or alternatively, by its entire periphery.

Such a membrane sheet, FIG. 12, 38, sealingly anchored to its outer support and sealing means, such as a frame, ring or a peripheral member 36, together form a plate frame filter element, one side of whose membrane surface communicates with introduced process fluid, while the other side communicates with permeate fluid, once such fluid has moved permeated the membrane. The resulting assembly may be called a plate frame element, 37.

Said plate frame element additionally includes one or more outlets for the ingress of process fluid, FIGS. 12, 11, for egress of the selected components of the process fluid permeating the membranes (permeates), FIG. 12, 14, and for egress of relatively de-liquefied retentate fluid, FIGS. 12, 15. A plurality of the resulting plate frame filter elements, when sealingly stacked in parallel may additional serve to form an integral containing vessel, including such vessel capable of maintaining its enclosed process fluid under pressure, FIG. 12, lower half of drawing.

As with the first, filter element embodiment, the tensioning method of filter element construction used to achieve said plate frame filter element also enables multiple means for applying vibration to the plate frame element thus formed, including vibration applied perpendicular to and through the membranes all across their open and unrestricted center work areas, vibration applied parallel to membranes to the elements themselves, air bubbling applied parallel or tangential to the planes of the membranes along their upstream surfaces, and combinations of all of these vibratory cleaning means. In many of these individual and combined means, a plurality of such plate frame elements sealingly stacked to form a containing or pressure vessel all may vibrated together in such manner or manners.

3. Filter Element Construction Having Flexible Membrane Envelope and Externally Applied Tension.

A third embodiment of the tensioning method for constructing a filter comprises two main elements. The first element comprises one or more flexible permeable membrane sheets, FIG. 13, 40, all of whose peripheral edges are joined by folding and or by sealing 42 to form a flexible membrane envelope 44. As with the two previous filter element embodiments, filter and plate frame, said flexible membrane envelope 44 defines a sealed inner space between the membrane sheets. In the case of this embodiment, spacing between said two membrane sheets may be maintained via flexible netting, bleed cloth or other permeable space holding elements. Provision may be made at a point or points around the periphery of such sealed flexible membrane envelopes for the egress of permeate, such as tubing or other orifices sealingly penetrating said periphery 45. In addition, means for the fastening of connecting elements between said edge and a relatively rigid outer support element, such as but not limited to grommets 45 may be provided.

The second element of this embodiment uses the tensioning method of filter construction of the present invention, to mount and suspend the flexible membrane envelope described immediately above, directly from and within the sides of a vessel, tank or cartridge. FIG. 14 is a cutaway perspective drawing of such an embodiment, showing a parallel set of flexible membrane envelopes 44, suspended within a frame, vessel or tank 48, by tensioning means 47 such as elastic or tensionable wires or cords.

4. Alternative Filter Element Construction With Flexible Membrane Envelope and Externally Applied Tensioning.

As with embodiment example 3, preceding, this alternative embodiment of the tensioning method of filter element construction combines a flexible membrane element, as described herein, but now formed of two sheets of flexible membrane sheet material, again sealingly joined at all its peripheral edges, but now in a relatively continuous or endless shape, whereby the length of said flexible membrane envelope greatly exceeds its width, FIG. 16, 52. This embodiment of a flexible membrane envelope 52 may have two additional elements, these being additional areas or zones in which the two membranes are sealingly joined, not at their peripheries, but cutting across the central area of the membrane envelope 53, so as to divide the continuous or endless central open space of the envelope into relatively longitudinal and separate segments. The second additional and optional element for this embodiment of the flexible membrane envelope is a means for mechanically separating such separately sealed envelope segments at the longitudinal sealing divider points 53, by means such as the relative and deliberate weakening of material such as a perforation 54, by which any two segments may be manually pulled apart and separated.

One of many embodiment means for mounting, tensioning and immersing such a continuous or endless, flexible membrane element into a vessel or tank containing process fluid is shown in FIG. 17. In this embodiment, a continuous flexible membrane envelope 52, is tensioned relatively across a vessel or tank 48, by means of a series of rollers. One roller, mounted either within or on the exterior of the tank, is a feed roller 55, on which a roll of new and unused flexible membrane envelope may be stored and kept in readiness. The continuous flexible membrane envelope then extends out from this feed roller across the vessel or tank, communicating with a series of tensioning rollers 59, which serve to locate and to place tension on all surfaces of the envelope. Finally the envelope communicates with a takeup roller 57, which provides additional tension and support, and also provides the means for providing a complete change of envelope membrane surface into the tank, when for various reasons the time comes to replace the previously exposed membrane surfaces with new portions of the envelope. This change occurs merely by winding the takeup roller 57 until the new membrane envelope is completely exposed to the process fluid in the tank.

5. Alternative Filter Element Construction Having Flexible Membrane Envelope and Externally Applied, Variably Tensionable.

This embodiment is essentially similar to the immediately preceding embodiment, with one alternative addition, as shown in FIG. 11. All elements are as described immediately above, with the exception of an added element. This added element comprises means to vary the tension on the tensioning rollers 59, continuously or at will during filtering operations. Such variation on the tensioning rollers 59 may be achieved by means of a movable roller mount, with one such embodiment of such means shown as a sliding rack 60. Said movable roller mount may be controlled manually or via machine logic and controls, depending on the application.

In the case of all three flexible membrane envelope embodiments, wherein tensioning of the membranes is achieved by suspending the envelopes from exterior frames or vessel walls, several types of membrane surface cleaning are enabled. One such means is to apply vibration perpendicular to and through the membranes all across their open and unrestricted center work area. Another cleaning means is to apply air bubbling parallel or tangential to the planes of the membranes along their upstream surfaces. A third cleaning means possibly unique to these tensioned flexible membrane embodiments, is to change the tautness and surface shapes of the membrane surfaces by variably tensioning the envelope during filtration. This method is intended to shake loose heavy or brittle accumulations of cake depositing on upstream membrane surfaces. Combinations of all of these vibratory cleaning methods are also enabled by the tensioning device incorporating teachings of the present invention in these embodiments. In these individual and these combined means, a plurality of such plate frame elements mounted relatively parallel to one another may all be vibrated together in such manner or manners.

6. Tensioned Membrane Construction with Flexible Membrane Envelope within a Spiral Wound Tank or Cartridge.

Yet another preferred embodiment of the invention uses the tensioning method of filter construction to suspend a flexible membrane envelope sheet, FIG. 21 63, longitudinally between end cap devices, FIGS. 24, 25 and 26, 73, from the two ends of within a relatively elongated cylindrical cartridge FIGS. 24, 25 and 26, 74, and with said sheet wound into a relatively tight spiral.

Envelope tensioning by two opposite end caps can be provided, such as a continuous spiral track cast into the interior facing surface of an end cap, which track is provides means for holding and tensioning a bulbous protrusion FIGS. 22, 68, along a sealed side of the membrane envelope, which continuous rib like protrusion may be guided into the spiral track. The resulting assembly of this embodiment includes two end caps, a surrounding and containing cartridge wall communicating between and sealingly with both end caps, the suspended spiral wound tensioned membrane envelope, and various plumbing means. Such plumbing means may include one or multiple inlets for process fluid through the end cap at one end, interspersed so that process fluid is introduced into all of the spaces between upstream membrane surfaces of the spiral wound envelope. Plumbing means may also include one or multiple inlets for accumulating retentate in the end cap at the opposite end from the process fluid openings. And plumbing means for withdrawing permeate may comprise means for sealingly penetrating the continuous, spiral wound tensioned membrane envelope at various locations, with such means such as flexible tubing, communicating to the outside of the overall vessel.

In the case of all the spiral wound embodiment for a flexible membrane envelope, again, several types of membrane surface cleaning are enabled. One such means is to apply vibration perpendicular to and through the membranes all across their open and unrestricted center work area. This may be effected via a vibrating longitudinal and eccentric rodlike stirring element, FIG. 26, 77, mounted to rotate eccentrically within the center axis of the spiral wound envelope, and thus emitting axial vibrations perpendicular to the spiral wound envelope at each individual vibratory intersection. Another cleaning means is to apply air bubbling, FIGS. 24, 25 and 26, 72 parallel or tangential to the planes of the membranes along their upstream surfaces, between all of the spiral-wound upstream membrane surfaces. A third cleaning means possible for this embodiment is to employ means of changing the tautness and surface shapes of the membrane surfaces, FIGS. 25 and 26, 75 and 76, by variably tensioning the envelope during filtration, using means to lateral moving the end caps of the spiral-wound canister. Combinations made also be achieved of all of these vibratory cleaning means enabled by a tensioning device incorporating teachings of the present invention in these embodiments.

For some applications, a sheet of filter media may be stretched to maintain a particular flat shape, and which is net like in structure and can transport fluid cross ways along the direction of it's primary plane. The filter media replaces rigid plastic or metal found in other filtration systems.

The sheet of filters media may be strong enough to be bounced perpendicular. The sheet of filter media may be cast. The sheet of filter media may be woven, ala tennis racket. The sheet of filter media may be nylon or urethane, tensionable and have shape memory.

At least two sheets of filter media membrane, (woven and non-woven filter) may be applied to opposite sides of a spacer or cross netting. The membranes are capable of being adhered to the cross net or bonded thru welding (ultra sonic, heat, electron beam, friction, etc.). This is the primary sandwich or composite envelope.

At least two sets of anchor points or clamping lines to which the cross netting is attached either direction or indirectly and tensioned and which hold the flat shape in a plane. The anchor points or clamping lines may be placed in a spiral so that an envelope could be stretched between two spiral clamps and a clear passage way could be maintained on upstream side of the envelope.

A seal or gasket (when clamped) which is applied to the periphery to create inside and outside or upstream or downstream. The system may work from out to in with the upstream being consistently on the inside.

Fluid flow paths carry permeate from the interior of an envelope to a collection point that leads to the exterior of the filtration system.

Since the tensioning shape holding force often passes through the line of sealing at the periphery, the space may also be sealed to prevent crossbleed fluid to what will be the exterior of the envelope while tension is maintained on the crossflow netting or spaces.

The envelope may be built to maintain shape, bounce, and maintain clearance passage for process fluid between multiple sheets. Various embodiments be placed in an open vessel, a pressure vessel, spiral wound cartridge, and a plate-frame system. Each embodiment may include peripheral sealing and tension transfer.

Although the present invention and its advantages have been described in detail, it should be understood that various changes, substitutions and alterations may be made without departing from the spirit and scope of the invention as defined by the following claims.

What is claimed is:

1. A filtration system operable to separate a process fluid into selected components comprising:
   a housing having at least one inlet operable to received the process fluid;
   the housing having at least a first outlet for a retentate and a second outlet for a permeate;
   a filter element disposed within the housing;
   the filter element having at least one flexible membrane with a central work area, which is not obstructed by mechanical support and a periphery;
   the periphery of the at least one membrane is anchored with respective supporting structures;
   the central work area of the flexible membrane is open for contact with the process fluid and operable to separate the process fluid into the permeate and retentate;
   a first fluid flow path coupling the retentate with the first outlet;
   a second fluid flow path coupling the permeate with the second outlet;
   the periphery of the at least one flexible membrane in the filter element are generally aligned with each other;
   the respective supporting structures are adapted to apply tension around the periphery of the at least one flexible membrane;
   at first end and a second end with said filter element disposed therebetween; and
   at least one end of the housing formed in part by with a flexible, impermeable diaphragm.

2. The filtration system of claim 1,
   wherein the filter element has at least one flexible membrane enveloped;
   each flexible membrane enveloped having a chamber formed therein to receive permeate from the process fluid;
   each envelope having a first and a second layer of the flexible membranes with a spacer therebetween and sealed outer edges of each membrane envelope.

3. The filtration system of claim 2 wherein each membrane envelope further comprises:
   the first layer and the second layer bonded with each other along the periphery of each flexible membrane envelope; and
   the periphery of each flexible membrane envelope securely engaged with the respective supporting structures.

4. A filtration system operable to separate a process fluid into selected components comprising:
   a housing having at least one inlet operable to receive the process fluid;
   the housing having at least a first outlet for retentate and a least a second outlet for a permeate;
   a filter element disposed within the housing;
   the filter element having at least on flexible membrane with a central open work area, which is not obstructed by mechanical support nor by respective outlets for the permeate and retentate;

each flexible membrane having a periphery;
respective supporting structures secured with the periphery of each flexible membrane, and adapted to apply tension to the membranes at is periphery;
each flexible membrane open for contact with the process fluid ad operable to separate the process fluid into the permeate and retentate;
a first fluid flow path coupling the retentate with the first outlet;
a second fluid flow path coupling the permeate with the first outlet;
the housing having a first end and a second end with the filter element disposed therebetween;
the housing having one end formed in part with a flexible, impermeable diaphragm;
and
the housing having the other end formed in part with a flexible impermeable diaphragm.

* * * * *